US011519720B2

(12) United States Patent
Golani et al.

(10) Patent No.: US 11,519,720 B2
(45) Date of Patent: Dec. 6, 2022

(54) DEPTH PROFILING OF SEMICONDUCTOR STRUCTURES USING PICOSECOND ULTRASONICS

(71) Applicant: Applied Materials Israel, Ltd., Rehovot (IL)

(72) Inventors: Ori Golani, Ramat-Gan (IL); Ido Almog, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 16 days.

(21) Appl. No.: 17/068,693

(22) Filed: Oct. 12, 2020

(65) Prior Publication Data
US 2022/0113129 A1    Apr. 14, 2022

(51) Int. Cl.
*G01B 11/22* (2006.01)
*G01B 11/06* (2006.01)

(52) U.S. Cl.
CPC .............. *G01B 11/22* (2013.01); *G01B 11/06* (2013.01); *G01B 2210/56* (2013.01)

(58) Field of Classification Search
CPC ...... G01B 11/22; G01B 11/06; G01B 2210/56
USPC .......................................................... 356/36
See application file for complete search history.

(56) References Cited

U.S. PATENT DOCUMENTS 6,002,480 A * 12/1999 Izatt ................... G01B 9/02072
356/479
7,050,178 B2    5/2006 Morath et al.
8,312,772 B2   11/2012 Tas et al.
9,268,092 B1 *  2/2016 Jarecki, Jr. .............. G02F 1/125
9,576,862 B2    2/2017 Murray
10,088,418 B2  10/2018 Cheshnovsky
10,371,668 B2   8/2019 Garnett
(Continued)

FOREIGN PATENT DOCUMENTS

WO    WO-2020247473 A1 * 12/2020

OTHER PUBLICATIONS

Gusev, Advances in Application of Time Domain Brillouin . . . , Sep. 2018, Applied Physics, pp. 01-19 (Year: 2018).*
(Continued)

*Primary Examiner* — Tarifur R Chowdhury
*Assistant Examiner* — Omar H Nixon
(74) *Attorney, Agent, or Firm* — Lowenstein Sandler LLP

(57) ABSTRACT

Disclosed herein is a method for depth-profiling of samples including a target region including a lateral structural feature. The method includes obtaining measured signals of the sample and analyzing thereof to obtain a depth-dependence of at least one parameter characterizing the lateral structural feature. The measured signals are obtained by repeatedly: projecting a pump pulse on the sample, thereby producing an acoustic pulse propagating within the target region; Brillouin-scattering a probe pulse off the acoustic pulse within the target region; and detecting a scattered component of the probe pulse to obtain a measured signal. In each repetition the respective probe pulse is scattered off the acoustic pulse at a respective depth within the target region, thereby probing the target region at a plurality of depths. A wavelength of the pump pulse is at least about two times greater than a lateral extent of the lateral structural feature.

20 Claims, 12 Drawing Sheets

(56) References Cited

U.S. PATENT DOCUMENTS

| | | | |
|---|---|---|---|
| 2015/0003834 A1* | 1/2015 | Shan | G01D 5/35364 |
| | | | 398/116 |
| 2016/0109736 A1* | 4/2016 | Bahl | G02B 6/29341 |
| | | | 385/1 |
| 2017/0254749 A1 | 9/2017 | Yun | |
| 2019/0242820 A1 | 8/2019 | Audoin et al. | |
| 2019/0335994 A1* | 11/2019 | Yun | G01J 3/0229 |

OTHER PUBLICATIONS

Gusev, et al., "Advances in applications of time-domain Brillouin scattering for nanoscale imaging", Applied Physics Reviews, American Institute of Physics, 2 Huntington Quadrangle, Melville, NY, 11747, vol. 5, No. 3, Jul. 12, 2018 (Jul. 12, 2018), XP012229987, DOI: 10.1063/1.5017241 [retrieved on Jul. 12, 2018].

PCT International Search Report and Written Opinion for International Application No. PCT/US2021/054439, dated Jan. 20, 2022, 15 pages.

Matsuda et al., "Coherent shear phonon generation and detection with picosecond laser acoustics," Physical Review. B, Condensed Matter and Materials Physics, 77(22), 224110, https://doi.org/10.1103/PhysRevB.77.224110, Jun. 20, 2008, 17 pages.

Matsuda et al., Fundamentals of picosecond laser ultrasonics, Ultrasonics, vol. 56, Feb. 2015, pp. 3-20.

* cited by examiner

```
┌─────────────────────────────────────────────────────────────┐
│ Providing a sample. The sample includes a target region,    │
│ which includes a lateral structural feature.                │
└─────────────────────────────────────────────────────────────┘
                                                   └── 310
                            │
                            ▼
┌─────────────────────────────────────────────────────────────┐
│ Obtaining a plurality of m measured signals by:             │
│                                                             │
│            ┌──────────────────────────────────────────────┐ │
│            │ Projecting a pump pulse on the sample, such  │ │
│         ┌─▶│ as to produce an acoustic pulse, which       │ │
│         │  │ propagates within the target region.         │ │
│  × m    │  └──────────────────────────────────────────────┘ │
│  times, │                                      └── 320a     │
│  each   │  ┌──────────────────────────────────────────────┐ │
│  time   │  │ Projecting a probe pulse on the sample, such │ │
│ probing │  │ that the probe pulse undergoes Brillouin     │ │
│  at a   │  │ scattering off the acoustic pulse within the │ │
│  resp.  │  │ target region.                               │ │
│  depth  │  └──────────────────────────────────────────────┘ │
│         │                                      └── 320b     │
│         │  ┌──────────────────────────────────────────────┐ │
│         └──│ Detecting a scattered component of the probe │ │
│            │ pulse to obtain a measured signal.           │ │
│            └──────────────────────────────────────────────┘ │
│                                                └── 320c     │
└─────────────────────────────────────────────────────────────┘
                                                   └── 320
                            │
                            ▼
┌─────────────────────────────────────────────────────────────┐
│ Analyzing the plurality of m measured signals to obtain a   │
│ depth-dependence of at least one parameter characterizing   │
│ the lateral structural feature.                             │
└─────────────────────────────────────────────────────────────┘
                                                   └── 330
```

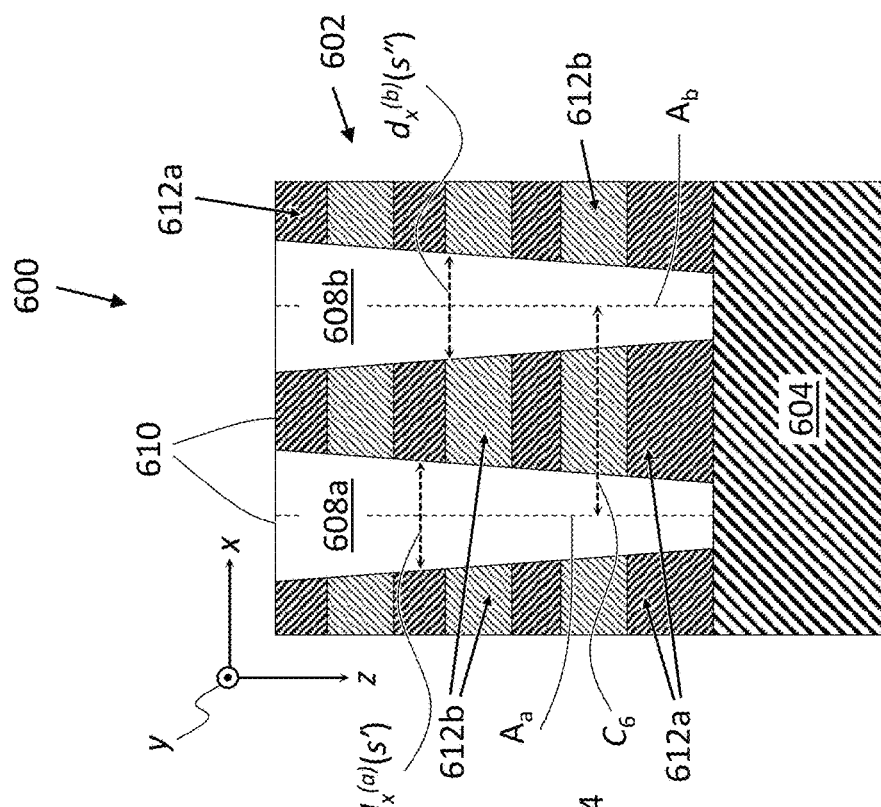
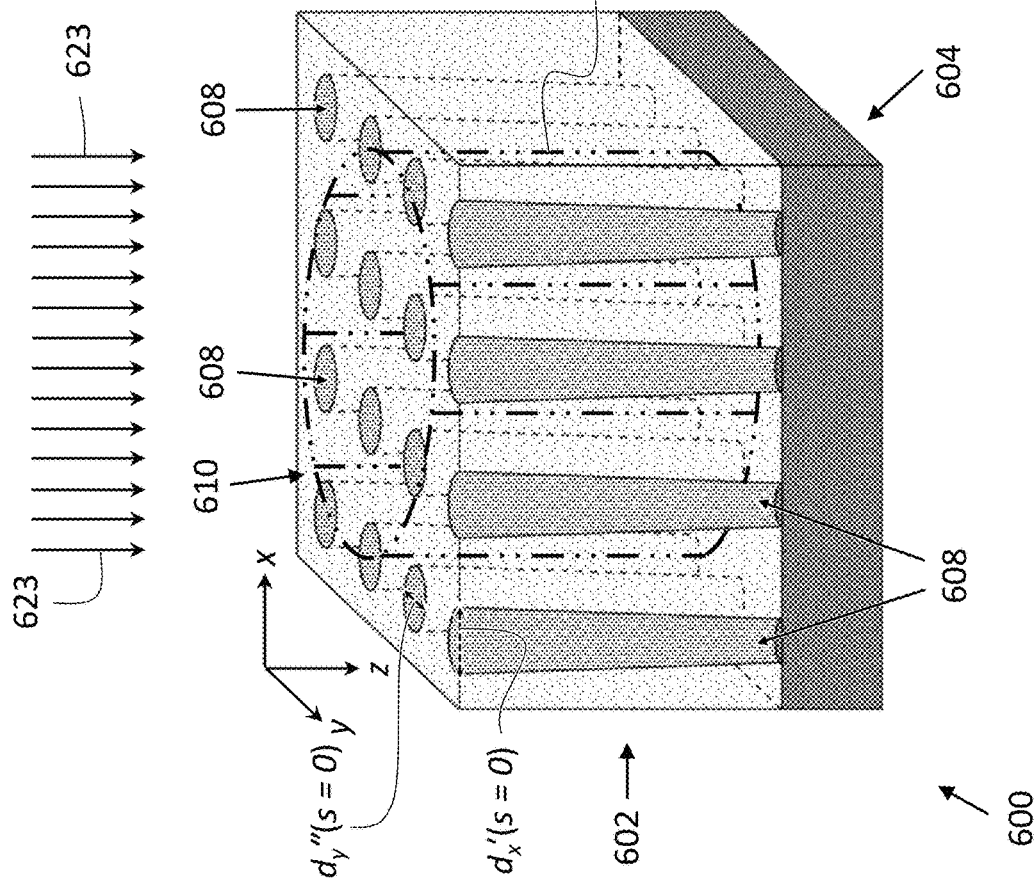
Fig. 6B
Fig. 6A

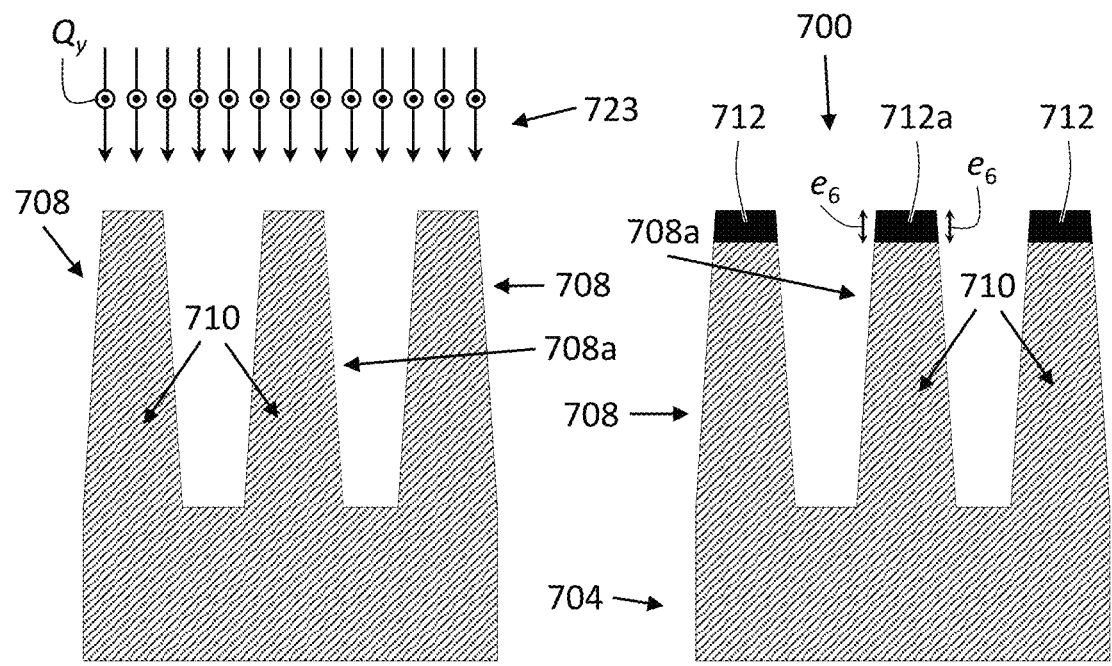
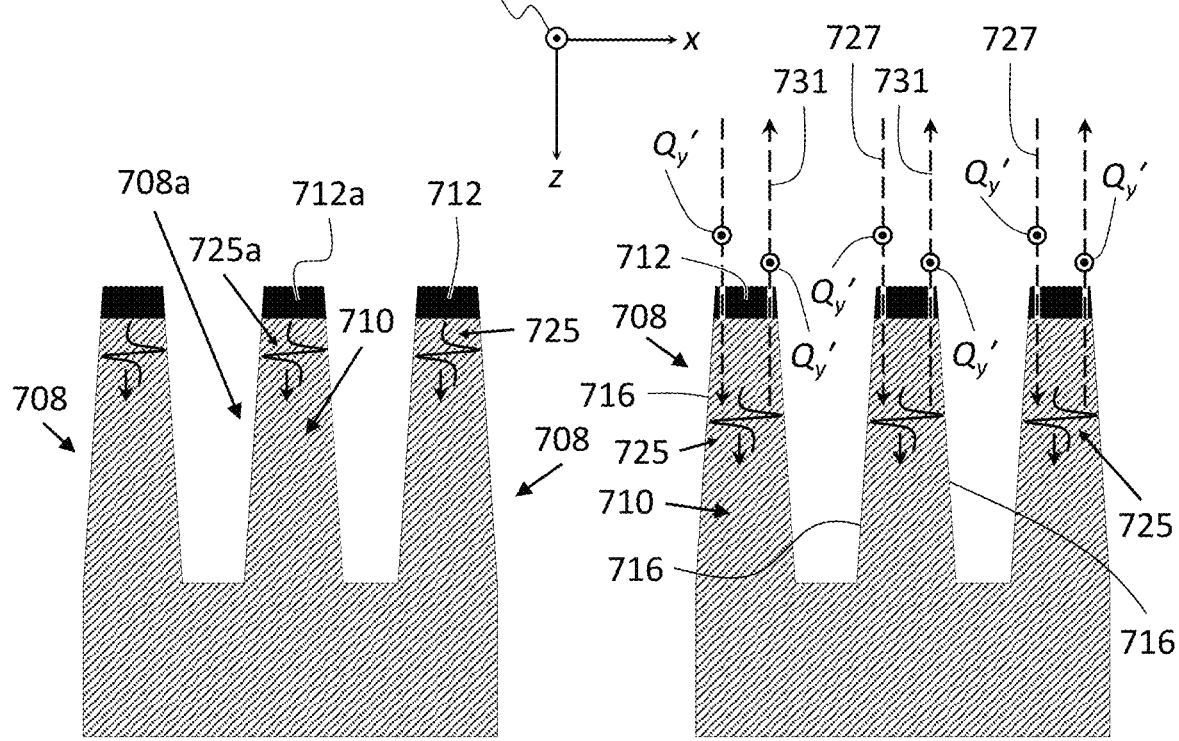

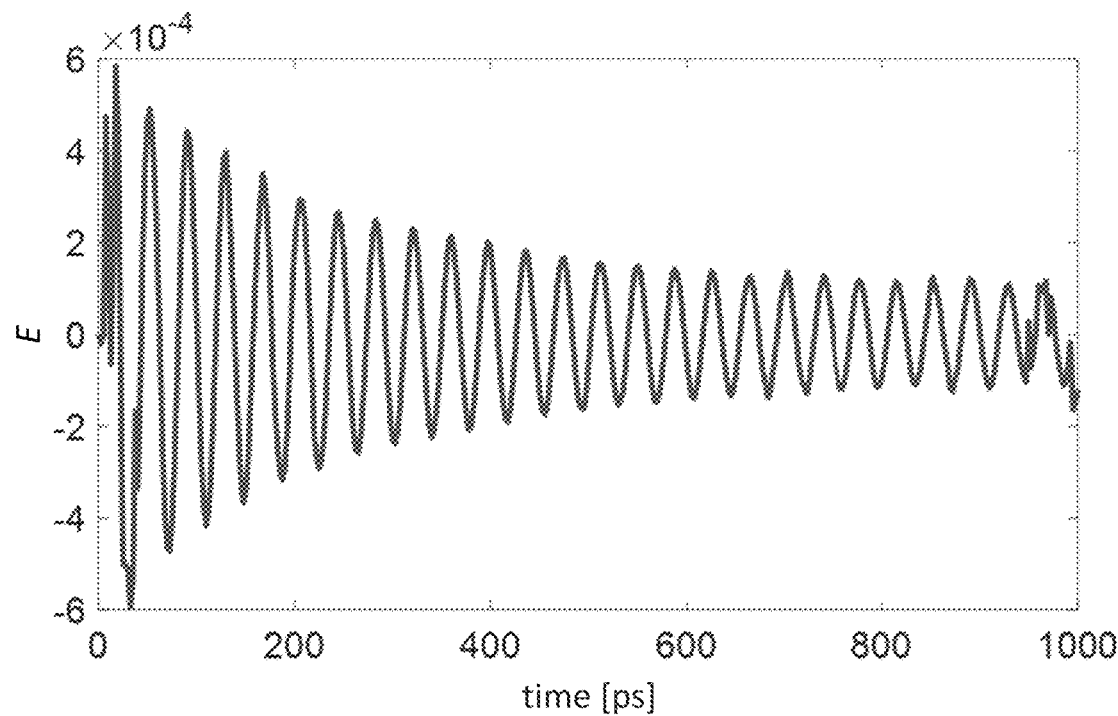
Fig. 8
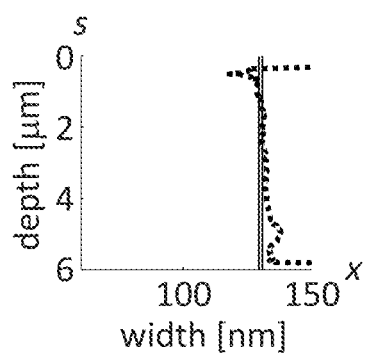 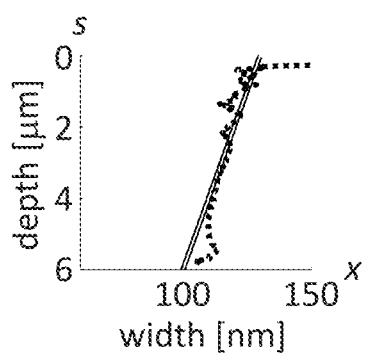 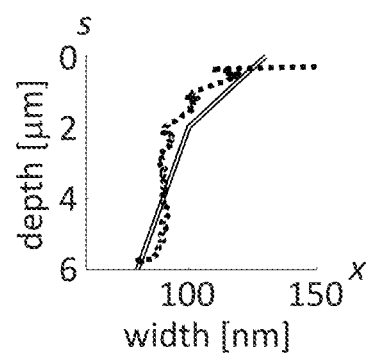
Fig. 9A  Fig. 9B  Fig. 9C
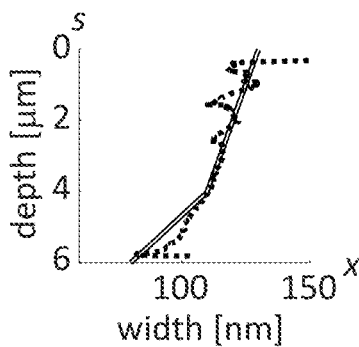 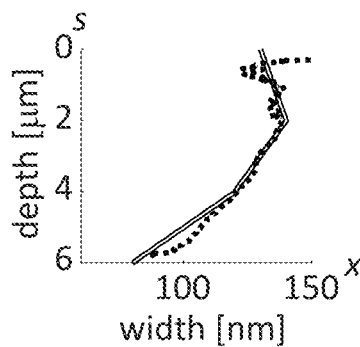
Fig. 9D  Fig. 9E

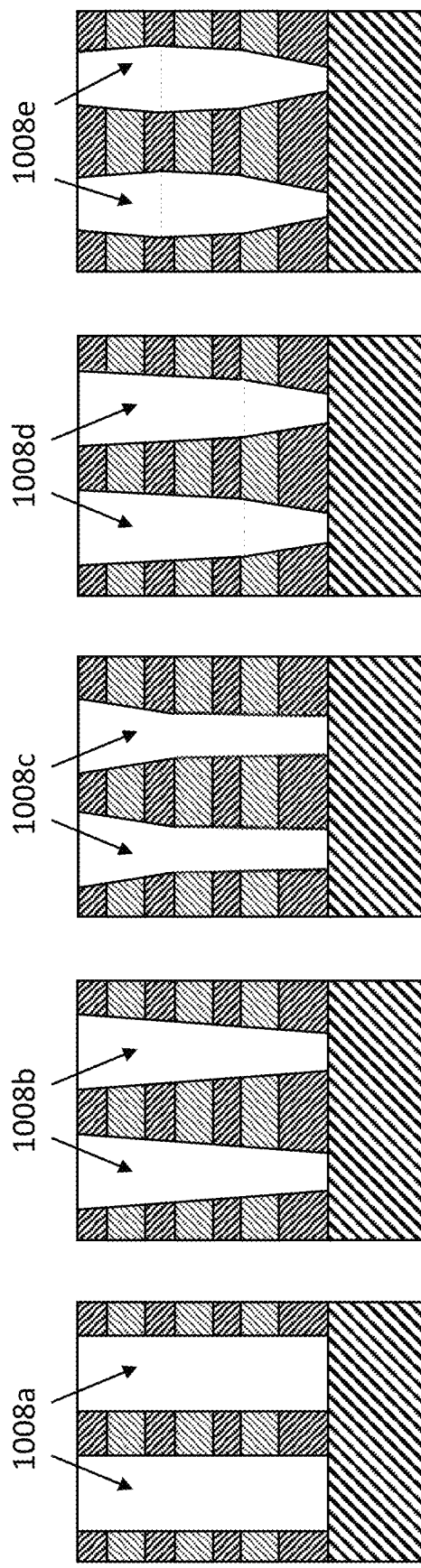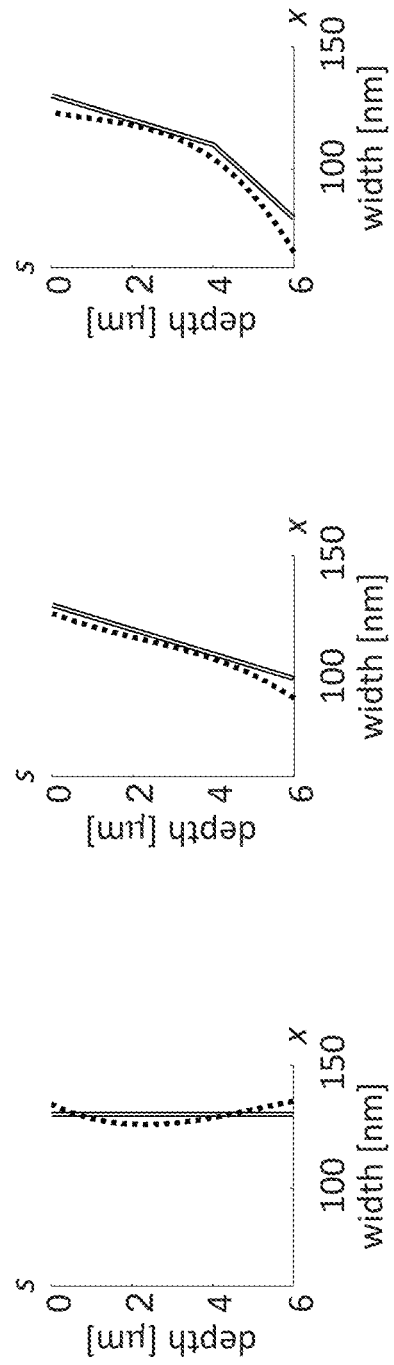

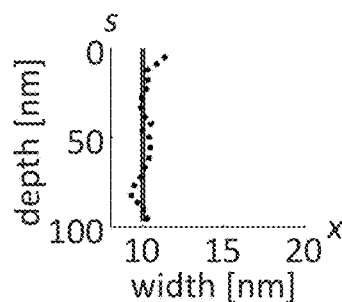
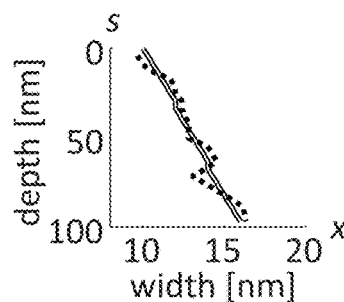
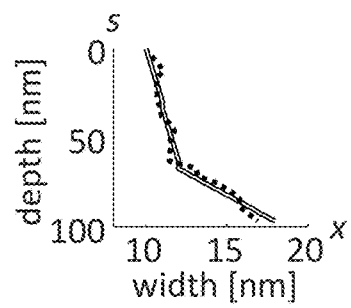
Fig. 14A          Fig. 14B          Fig. 14C
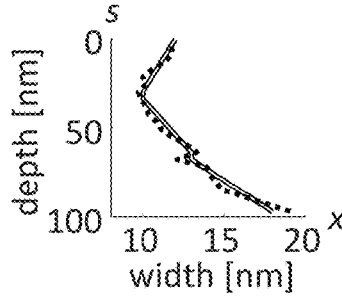
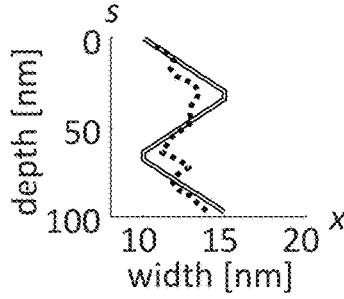
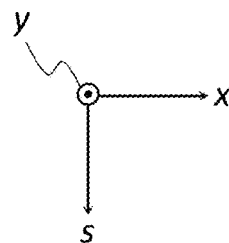
Fig. 14D          Fig. 14E
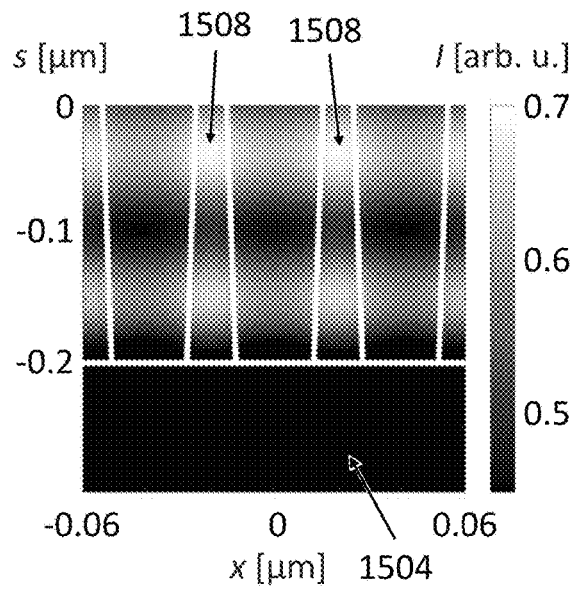
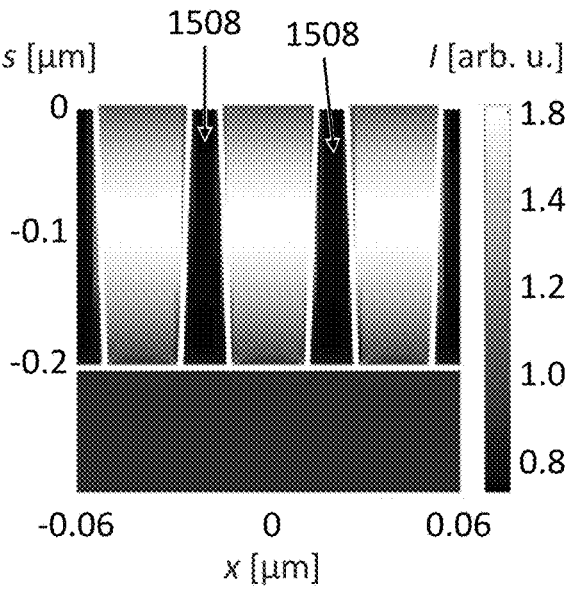
Fig. 15A          Fig. 15B

DEPTH PROFILING OF SEMICONDUCTOR STRUCTURES USING PICOSECOND ULTRASONICS

TECHNICAL FIELD

The present disclosure relates generally to depth-profiling of samples.

BACKGROUND

Picosecond ultrasonics (also referred to as "picosecond laser ultrasonics" and "laser picosecond acoustics") is a non-destructive technique which may be used for obtaining structural information from thin films and nanostructures. In a typical scenario, an ultrashort light pulse (usually referred to as a "pump pulse") may be projected on an external surface of a structure. A thin tranche of the structure, adjacent to and including the external surface, is heated by absorbing the light pulse. Due to the heating thereof, the tranche expands, leading to the formation of an acoustic pulse (also referred to as an "elastic strain pulse" or "strain pulse"), which travels into the depth of the structure and away from the external surface. On reaching a boundary surface, such as the opposite side of a thin film or a second layer of a multi-layered structure, at least part of the acoustic pulse is reflected and propagates back towards the external surface. A probe signal is projected on the external surface such as to be incident thereon when the acoustic pulse arrives thereat. The probe signal reflected off the external surface and the intensity of the reflected component of the probe signal is monitored. From the monitored intensity of the reflected component, one-dimensional structural information regarding the probed structure—such as, for example, film thickness or thicknesses of layers (when the structure is multi-layered)—may be extracted.

SUMMARY

Aspects of the disclosure, according to some embodiments thereof, relate to depth-profiling of samples employing picosecond ultrasonics. More specifically, but not exclusively, aspects of the disclosure, according to some embodiments thereof, relate to picosecond ultrasonics-based methods and systems for depth-profiling of samples, particularly, semiconductor devices and structures.

Thus, according to an aspect of some embodiments, there is provided a method for depth-profiling of samples. The method includes operations of:
  Providing a sample including a target region. The target region includes a lateral structural feature.
  Obtaining a plurality of measured signals by implementing a plurality of times sub-operations of:
    Projecting an optical pump pulse on the sample, such as to produce an acoustic pulse, which propagates within the target region of the sample. A wavelength of the pump pulse is at least about two times greater than a lateral extent of the lateral structural feature along at least one lateral direction.
    Projecting an optical probe pulse on the sample, such that the probe pulse undergoes Brillouin scattering off the acoustic pulse within the target region.
    Detecting a scattered component of the probe pulse to obtain a measured signal.
  In each implementation the respective probe pulse is scattered off the acoustic pulse at a respective depth within the target region, such that the target region is probed at a plurality of depths.
  Analyzing the plurality of measured signals to obtain a depth-dependence of at least one parameter characterizing the lateral structural feature.

According to some embodiments of the method, a direction of propagation of the acoustic pulses within the target region is parallel to a longitudinal dimension of the target region. The longitudinal dimension parameterizes depth within the sample.

According to some embodiments of method, a propagation of the acoustic pulses propagation within the target region is such as to allow depth-profiling of an entirety of the target region.

According to some embodiments of the method, the probe pulses are configured such that an absorption length thereof in the target region is greater than an extent of the target region along the longitudinal dimension.

According to some embodiments of method, the wavelength of the pump pulse is at least about two times greater than a lateral extent of the lateral structural feature along any lateral direction (i.e. all lateral directions).

According to some embodiments of the method, the lateral structural feature is manifested as a change in a refractive index, and/or a change in a speed of sound, in the target region along at least one lateral direction.

According to some embodiments of the method, the change in the refractive index and/or speed of sound is due to one or more changes in the target region, due to design (i.e. variations in e.g. the structure and/or composition dictated by the design of the sample), along the at least one lateral direction. The one or more changes may include changes in a geometry, material composition, media, mass density, density of embedded elements and/or voids, and/or spatial arrangement of embedded elements and/or voids, of the target region along the at least one lateral direction. The at least one parameter characterizing the lateral structural feature includes one or more parameters characterizing said geometry, material composition, media, mass density, density of embedded elements and/or voids, and/or spatial arrangement of embedded elements and/or voids.

According to some embodiments of the method, the target region includes one or more embedded elements, which include one or more conduction lines, pads, solder bumps, holes, doping concentrations, transistors, transistor components, and/or through-silicon vias.

According to some embodiments of the method, the voids are formed by spaces between parallel fins on an external surface of the target region.

According to some embodiments of the method, in the analysis of the plurality of measured signals, a pre-determined expected depth-dependence of the at least one parameter characterizing the lateral structural feature is taken into account.

According to some embodiments of the method, in the analysis of the plurality of measured signals, fitting tools are used to obtain the depth-dependence of the at least one parameter. The data fitting tools may be derived using machine learning techniques and/or deep learning techniques.

According to some embodiments of the method, the data fittings tools may include regression analysis (e.g. linear regression) and/or an artificial neural network (ANN).

According to some embodiments of the method, the ANN may be derived using deep learning tools. According to some such embodiments, the ANN may be trained based on data obtained at least from: (i) previous implementations on the method on samples manufactured to same design specifications and/or similar design specifications, (ii) physical modeling of the sample and, optionally, a system used to implement the method, which physical modeling may include computer simulations of the sample and the system, and/or (iii) existing libraries of measured and/or simulated signals in similar setups (i.e. similar samples and systems).

According to some embodiments of the method, actual depth-dependencies (geometry and/or composition) of different lateral structural features within different samples may be correlated to pluralities of measured signals corresponding to the lateral structural features, respectively. The actual (i.e. true) depth-dependencies of the lateral structural features may be obtained utilizing scanning-electron microscopy. The pluralities of measured signals may be obtained by implementing the signal acquisition operations described above. The obtained correlations may then be used to determine the expected depth-dependence of a lateral structural feature of a sample with respect to which the above-described method is to be performed.

According to some embodiments of the method, the analysis of the plurality of measured signals takes into account a simulation signal, obtained by computer simulations of the sample and a system used to implement the method. The simulation signal includes expected outputs of a simulated detector in conditions wherein the lateral structure feature, and the depth dependence thereof, are pre-specified (e.g. equal design specifications or deviate in a defined manner from the design specifications). The simulated detector models a detector used to obtain the plurality of measured signals in the operation of detecting the scattered component.

According to some embodiments of the method, the analysis of the plurality of measured signals includes obtaining a time-dependence of a frequency, and/or a time-dependence of an amplitude, of Brillouin oscillations characterizing the scattered components of the probe pulse, and, based thereon, obtaining the depth-dependence of the at least one parameter characterizing the lateral structural feature According to some embodiments of the method, the analysis of the plurality of measured signals includes removing a thermo-optic contribution to the plurality of measured signals.

According to some embodiments of the method, the pump pulses and/or the probe pulses are projected on the sample such as to be incident on an external surface of the sample at a vanishing (i.e. 0°), or substantially vanishing, incidence angle. The external surface is parallel to the target region.

According to some embodiments of the method, a wavelength of the probe pulse is at least about two times greater than a lateral extent of the lateral structural feature.

According to some embodiments of the method, each of the pump pulses is configured to induce a mechanical strain in a lateral absorption layer(s) of the sample, and thereby produce the respective acoustic pulse. The absorption layer(s) may be perpendicular to a longitudinal dimension of the target region, which parameterizes depth within the sample.

According to some embodiments of the method, each of the pump pulses includes a respective pump envelope and a respective pump carrier. The pump carrier may be configured to facilitate penetration into the sample and the absorbance of the pump pulse within the absorption layer. The pump envelope may be configured to facilitate separating the scattered component from background signals and noise.

According to some embodiments of the method, the analysis of the plurality of measured signals includes obtaining an extracted signal from the plurality of measured signals by demodulating each of the measured signals and combining the demodulated signals into a single signal. According to some embodiments, the demodulation may be performed using a lock-in amplifier, to which a modulation frequency of the pump pulse (i.e. the shape of the pump envelope) is fed as an input.

According to some embodiments of the method, the absorption layer is silicon-based and a duration of each of the pump pulses is shorter than 10 psec.

According to some embodiments of the method, a duration of each of the probe pulses is shorter than about 10 psec.

According to some embodiments of the method, a frequency of the pump pulses and/or a frequency of the probe pulses are such as to maximize, or substantially maximize, an intensity of the scattered components of the probe pulses.

According to some embodiments of the method, a width of the acoustic pulses is smaller than about 300 nm.

According to some embodiments of the method, the target region is positioned within the sample at a distance greater than about 1 μm (micron) from a nearest external surface of the sample, and/or an extent of the target region along the longitudinal dimension is greater than about 2 μm.

According to some embodiments of the method, each of the pump pulses is configured to induce the mechanical strain in the absorption layer(s) by heating thereof.

According to some embodiments of the method, a propagation direction in the target region of the acoustic pulses is perpendicular to the absorption layer(s).

According to some embodiments of the method, the target region includes the absorption layer(s).

According to some embodiments of the method, each of the acoustic pulses propagates away from a lateral external surface of the sample, on which the pump pulses and/or the probe pulses are projected.

According to some embodiments of the method, the absorption layer is positioned within the sample, and each of the acoustic pulses propagates away from the absorption layer towards a lateral external surface, on which the pump pulses and/or the probe pulses are projected.

According to some embodiments of the method, the target region includes a plurality of the lateral structural feature. The plurality of the lateral structural feature defines a composite lateral structural feature.

According to some embodiments of the method, a wavelength of the pump pulse and a wavelength of the probe pulse are configured to allow simultaneously probing two or more lateral structural features from the plurality of the lateral structural feature.

According to some embodiments of the method, a beam of the probe pulse is equal to, or substantially equal to, a beam diameter of the pump pulse.

According to some embodiments of the method, the composite lateral structural feature is periodic (i.e. the plurality of the lateral structural feature forms a repeating lateral structural pattern).

According to some embodiments of the method, in the operation of analyzing the plurality of measured signals, the obtained depth-dependence of the at least one parameter, characterizing the lateral structural feature, is an average (mean) depth-dependence over the plurality of the lateral structural feature.

According to some embodiments of the method, each of the probe pulses is polarized such as to maximize an intensity of the respective scattered component.

According to some embodiments of the method, each of the pump pulses is polarized such as to maximize absorption thereof in the absorption layer, and/or each of the pump pulses is polarized such as to minimize a thickness of the absorption layer, thereby increasing a resolution of the measured signal.

According to some embodiments of the method, the pump pulses and/or the probe pulses are polarized such as to maximize, or substantially maximize, intensities of the scattered components of the probe pulses.

According to some embodiments of the method, the target region includes a plurality of fins, disposed in parallel to one another, such as to form the composite lateral structural feature. The at least one parameter, characterizing the lateral structural feature, includes a parameter corresponding to an average width of the fins.

According to some embodiments of the method, the pump pulses and the probe pulses are linearly polarized in parallel, or substantially in parallel, to an elongate dimension of the fins.

According to some embodiments of the method, the elongate dimension of the fins is perpendicular to a longitudinal dimension of the target region, which parameterizes depth within the sample.

According to some embodiments of the method, the sample is a fin field-effect transistor (FinFET). According to some such embodiments, a width of the acoustic pulses is smaller than about 50 nm.

According to some embodiments of the method, the target region includes a plurality of holes projecting into the target region in parallel to a longitudinal dimension of the target region, which parameterizes depth within the sample. The holes are disposed such as to form the composite lateral structural feature. The at least one parameter characterizing the composite lateral structural feature includes a parameter corresponding to an average diameter or average area of the holes.

According to some embodiments of the method, the holes are arranged in a two-dimensional rectangular array.

According to some embodiments of the method, the probe pulse is linearly polarized along a lateral direction, which is parallel to a first direction, defined by rows of the two-dimensional rectangular array, or a second direction, defined by columns of the two-dimensional rectangular array, thereby increasing a measurement sensitivity along the second direction or the first direction, respectively.

According to some embodiments of the method, the sample is a vertical-NAND stack.

According to some embodiments of the method, the probe pulse is characterized by a first probe wavelength and/or a first probe polarization, and/or the pump pulse is characterized by a first pump wavelength and/or a first pump polarization. The method further includes, prior to the operation of analyzing the plurality of measured signals, repeating the operation of obtaining a plurality of measured signals, with respect to (i) a second probe pulse, characterized by a second probe wavelength and/or a second polarization, and/or (ii) a second pump pulse, characterized by a second pump wavelength and/or a second pump polarization, thereby obtaining a second plurality of measured signals. In the operation of analyzing the plurality of measured signals, the plurality of measured signals is analyzed together with at least the second plurality of measured signals.

According to some embodiments of the method, the operation of obtaining the plurality of measured signals further includes filtering out, or substantially filtering out, a returned component of the pump pulse, and/or background and noise, prior to detecting the scattered component of the probe signal.

According to some embodiments of the method, the sample is a semiconductor device, a component of a semiconductor device, or a semiconductor structure.

According to some embodiments of the method, the sample is a vertical-NAND stack, a FinFET, a DRAM structure, a gate-all-around transistor structure, or a phase-change memory.

According to an aspect of some embodiments, there is provided a sample analysis system configured to implement the above-described method.

According to an aspect of some embodiments, there is provided a computerized system (a sample analysis system) for depth-profiling of samples. The system includes an optical setup and a measurement data analysis module. The optical setup is configured to obtain a plurality of measured signals from a target region of a sample by repeatedly:

Projecting an optical pump pulse on the sample, such as to produce an acoustic pulse, which propagates within the target region. A wavelength of the pump pulse is at least about two times greater than a lateral extent of a lateral structural feature in the target region.

Projecting an optical probe pulse on the sample, such that the probe pulse undergoes Brillouin scattering off the acoustic pulse within the target region.

Detecting a scattered component of the probe pulse, thereby obtaining a respective measured signal from the plurality of measured signals.

In each repetition the probe pulse is scattered off the acoustic pulse at a respective depth within the target region. The measurement data analysis module is configured to analyze the plurality of measured signals, or a plurality of signals derived therefrom (e.g. demodulating the measured signals using a lock-in amplifier), to obtain a depth-dependence of at least one parameter characterizing the lateral structural feature along at least one lateral direction.

According to some embodiments of the computerized system, the optical setup includes signal generating equipment, and a detector. The signal generating equipment is configured to generate the pump pulses and the probe pulses and to controllably delay each probe pulse with respect to the corresponding pump pulse (thereby allowing to control the respective depths at which the probe pulses are scattered off the acoustic pulses). The detector is configured to detect the scattered components of the probe pulses.

According to some embodiments of the computerized system, the signal generating equipment includes a variable delay line allowing to controllably set a delay-time of each probe pulse with respect to the corresponding pump pulse.

According to some embodiments of the computerized system, the signal generating equipment includes at least one light source (e.g. a laser source) configured to generate the pump pulses and the probe pulses and at least one optical modulator configured to modulate the pump pulses and/or the probe pulses.

According to some embodiments of the computerized system, the system further includes a lock-in amplifier configured to demodulate the plurality of measured signals prior to the analysis thereof by the measurement data analysis module.

According to some embodiments of the computerized system, the signal generating equipment includes one or more polarization modules, which allow to controllably set a polarization(s) of the pump pulses and/or a polarization(s) the probe pulses.

According to some embodiments of the computerized system, the optical setup further includes a filter (e.g. an optical filter) configured to pass therethrough the scattered components and block background signals and noise.

According to some embodiments of the computerized system, the optical setup further includes an objective lens configured to focus the pump pulses and the probe pulses on the sample.

According to some embodiments of the computerized system, the optical setup further includes a controller configured to command and coordinate operation of the components of the optical setup (e.g. the optical modulator, the variable delay line). The controller may be communicatively associated with measurement data analysis module.

According to some embodiments of the computerized system, the optical setup is configured such that a direction of propagation of the acoustic pulses within the target region is parallel to a longitudinal dimension of the target region. The longitudinal dimension parameterizes depth within the sample.

According to some embodiments of computerized system, the optical setup is configured such that a propagation of the acoustic pulses propagation within the target region is such as to allow depth-profiling of an entirety of the target region.

According to some embodiments of the computerized system, the probe pulses are configured such that an absorption length thereof in the target region is greater than an extent of the target region along the longitudinal dimension.

According to some embodiments of method, the wavelength of the pump pulse is at least about two times greater than a lateral extent of the lateral structural feature along any lateral direction.

According to some embodiments of the computerized system, the lateral structural feature is manifested as a change in a refractive index, and/or a change in a speed of sound, in the target region along at least one lateral direction.

According to some embodiments of the computerized system, the change in the refractive index and/or speed of sound is due to one or more in the target region, due to design, along the at least one lateral direction. The one or more design changes may include changes in a geometry, material composition, media, mass density, density of embedded elements and/or voids, spatial arrangement of embedded elements and/or voids, of the target region along the at least one lateral direction. The at least one parameter characterizing the lateral structural feature includes one or more parameters characterizing said geometry, material composition, media, mass density, density of embedded elements and/or voids, spatial arrangement of embedded elements and/or voids.

According to some embodiments of the computerized system, the target region includes one or more embedded elements, which include one or more conduction lines, pads, solder bumps, holes, doping concentrations, transistors, transistor components, and/or through-silicon vias.

According to some embodiments of the computerized system, the voids are formed by spaces between parallel fins on an external surface of the target region.

According to some embodiments of the computerized system, the measurement data analysis module is configured to take into account—in the analysis of the plurality of measured signals—a pre-determined expected depth-dependence of the at least one parameter characterizing the lateral structural feature.

According to some embodiments of the computerized system, the measurement data analysis module is configured to employ fitting tools to obtain the depth-dependence of the at least one parameter. The data fitting tools may be derived using machine learning techniques and/or deep learning techniques.

According to some embodiments of the computerized system, the data fittings tools may include regression analysis (e.g. linear regression) and/or an artificial neural network (ANN).

According to some embodiments of the computerized system, the measurement data analysis module may be configured to take into account into account—feature in the analysis of the plurality of measured signals—a simulation signal, obtained by computer simulations of the sample and the optical setup. The simulation signal includes expected outputs of the detector in conditions wherein the lateral structure feature, and the depth dependence thereof, are pre-specified (e.g. equal design specifications or deviate in a defined manner from the design specifications).

According to some embodiments of the computerized system, the measurement data analysis module may be configured to obtain a time-dependence of a frequency, and/or a time-dependence of an amplitude, of Brillouin oscillations characterizing the scattered components of the probe pulse, and, based thereon, obtain the depth-dependence of the at least one parameter characterizing the lateral structural feature According to some embodiments of the computerized system, as part of the analysis of the plurality of measured signals, the measurement data analysis module may be configured to remove a thermo-optic contribution to the plurality of measured signals.

According to some embodiments of the computerized system, the optical setup may be configured such that the pump pulses and/or the probe pulses are incident on an external surface of the sample at a vanishing (i.e. 0°), or substantially vanishing, incidence angle. The external surface is parallel to the target region.

According to some embodiments of the computerized system, a wavelength of the probe pulse is at least about two times greater than a lateral extent of the lateral structural feature.

According to some embodiments of the computerized system, each of the pump pulses is configured to induce a mechanical strain in a lateral absorption layer(s) of the sample, and thereby produce the respective acoustic pulse. The absorption layer(s) may be perpendicular to a longitudinal dimension of the target region, which parameterizes depth within the sample.

According to some embodiments of the computerized system, each of the pump pulses includes a respective pump envelope and a respective pump carrier. The pump carrier may be configured to facilitate penetration into the sample and the absorbance of the pump pulse within the absorption layer. The pump envelope may be configured to facilitate separating the scattered component from background signals and noise.

According to some embodiments of the computerized system, the absorption layer is silicon-based and a duration of each of the pump pulses is shorter than 10 psec.

According to some embodiments of the computerized system, a duration of each of the probe pulses is shorter than about 10 psec.

According to some embodiments of the computerized system, a frequency of the pump pulses and/or a frequency of the probe pulses are such as to maximize, or substantially maximize, an intensity of the scattered components of the probe pulses.

According to some embodiments of the computerized system, a width of the acoustic pulses is smaller than about 300 nm.

According to some embodiments of the computerized system, the target region is positioned within the sample at a distance greater than about 1 μm (micron) from a nearest external surface of the sample, and/or an extent of the target region along the longitudinal dimension is greater than about 2 μm.

According to some embodiments of the computerized system, each of the pump pulses is configured to induce the mechanical strain in the absorption layer(s) by heating thereof.

According to some embodiments of the computerized system, a propagation direction in the target region of the acoustic pulses is perpendicular to the absorption layer(s).

According to some embodiments of the computerized system, the target region includes the absorption layer(s).

According to some embodiments of the computerized system, each of the acoustic pulses propagates away from a lateral external surface of the sample, on which the pump pulses and/or the probe pulses are projected.

According to some embodiments of the computerized system, the absorption layer is positioned within the sample, and each of the acoustic pulses propagates away from the absorption layer towards a lateral external surface, on which the pump pulses and/or the probe pulses are projected.

According to some embodiments of the computerized system, the target region includes a plurality of the lateral structural feature. The plurality of the lateral structural feature defines a composite lateral structural feature.

According to some embodiments of the computerized system, a wavelength of the pump pulse and a wavelength of the probe pulse are configured to allow simultaneously probing two or more lateral structural features from the plurality of the lateral structural feature.

According to some embodiments of the computerized system, a beam of the probe pulse is equal to, or substantially equal to, a beam diameter of the pump pulse.

According to some embodiments of the computerized system, the composite lateral structural feature is periodic.

According to some embodiments of the computerized system, the obtained depth-dependence of the at least one parameter, characterizing the lateral structural feature, is an average (mean) depth-dependence over the plurality of the lateral structural feature.

According to some embodiments of the computerized system, each of the probe pulses is polarized such as to maximize an intensity of the respective scattered component.

According to some embodiments of the computerized system, each of the pump pulses is polarized such as to maximize absorption thereof in the absorption layer, and/or each of the pump pulses is polarized such as to minimize a thickness of the absorption layer, thereby increasing a resolution of the measured signal.

According to some embodiments of the computerized system, the pump pulses and/or the probe pulses are polarized such as to maximize, or substantially maximize, intensities of the scattered components of the probe pulses.

According to some embodiments of the computerized system, the target region includes a plurality of fins, disposed in parallel to one another, such as to form the composite lateral structural feature. The at least one parameter, characterizing the lateral structural feature, includes a parameter corresponding to an average width of the fins.

According to some embodiments of the computerized system, the pump pulses and the probe pulses are linearly polarized in parallel, or substantially in parallel, to an elongate dimension of the fins.

According to some embodiments of the computerized system, the elongate dimension of the fins is perpendicular to a longitudinal dimension of the target region, which parameterizes depth within the sample.

According to some embodiments of the computerized system, the sample is a fin field-effect transistor (FinFET). According to some such embodiments, a width of the acoustic pulses is smaller than about 50 nm.

According to some embodiments of the computerized system, the target region includes a plurality of holes projecting into the target region in parallel to a longitudinal dimension of the target region, which parameterizes depth within the sample. The holes are disposed such as to form the composite lateral structural feature. The at least one parameter characterizing the composite lateral structural feature includes a parameter corresponding to an average diameter or average area of the holes.

According to some embodiments of the computerized system, the holes are arranged in a two-dimensional rectangular array.

According to some embodiments of the computerized system, the probe pulse is linearly polarized along a lateral direction, which is parallel to a first direction, defined by rows of the two-dimensional rectangular array, or a second direction, defined by columns of the two-dimensional rectangular array, thereby increasing a measurement sensitivity along the second direction or the first direction, respectively.

According to some embodiments of the computerized system, the sample is a vertical-NAND stack.

According to some embodiments of the computerized system, the probe pulses are characterized by a first probe wavelength and/or a first probe polarization, and/or the pump pulses are characterized by a first pump wavelength and/or a first pump polarization. The optical setup is further configured to obtain a second plurality of measured signals from the target region utilizing second probe pulses and second pump pulses. The second probe pulses are characterized by a second probe wavelength and/or a second probe polarization. The second pump pulses are characterized by a first pump wavelength and/or a first pump polarization. The measurement data analysis module is configured to additionally take into account the second plurality of measured signals as part of the analysis to obtain the depth-dependence of the at least one parameter characterizing the lateral structural feature.

According to some embodiments, the sample is a semiconductor device, a component of a semiconductor device, or a semiconductor structure.

According to some embodiments of the computerized system, the sample is a vertical-NAND stack, a FinFET, a DRAM structure, a gate-all-around transistor structure, or a phase-change memory.

According to an aspect of some embodiments, there is provided a sample analysis system configured to implement the above-described method.

According to an aspect of some embodiments, there is provided a non-transitory computer-readable storage medium storing instructions that cause a sample analysis system to implement the above-described method.

According to an aspect of some embodiments, there is provided a non-transitory computer-readable storage medium storing instructions that cause a sample analysis system to:

Obtain a plurality of measured signals of a sample, which comprises a target region, comprising a lateral structural feature, by implementing a plurality of times sub-operations of:

Projecting an optical pump pulse on the sample, such as to produce an acoustic pulse, which propagates within the target region of the sample. A wavelength of the pump pulse is at least about two times greater than a maximal lateral dimension of the lateral structural feature along at least one lateral direction.

Projecting an optical probe pulse on the sample, such that the probe pulse undergoes Brillouin scattering off the acoustic pulse within the target region.

Detecting a scattered component of the probe pulse to obtain a measured signal.

In each implementation the respective probe pulse is scattered off the acoustic pulse at a respective depth within the target region, such that the target region is probed at a plurality of depths.

Analyze the plurality of measured signals to obtain a depth-dependence of at least one parameter characterizing the lateral structural feature.

According to an aspect of some embodiments, there is provided a method for depth-profiling of samples. The method includes operations of:

Providing a sample including a target region. The target region which includes a lateral structural feature.

Obtaining a plurality of measured signals by implementing a plurality of times sub-operations of:

Projecting an optical pump pulse on the sample, such as to induce a mechanical strain in a lateral absorption layer of the sample and thereby produce an acoustic pulse, which propagates within the target region of the sample.

Projecting an optical probe pulse on the sample, such that the probe pulse undergoes Brillouin scattering off the acoustic pulse within the target region.

Detecting a scattered component of the probe pulse to obtain a measured signal.

In each implementation the respective probe pulse is scattered off the acoustic pulse at a respective depth within the target region, such that the target region is probed at a plurality of depths. The absorption layer is positioned within the sample (i.e. such that no surface of the absorption layer coincides with an external surface of the sample), such that each of the acoustic pulses propagates away from the absorption layer towards a lateral external surface, on which the pump pulses and/or the probe pulses are projected.

Analyzing at least the plurality of measured signals to obtain a depth-dependence of at least one parameter characterizing the lateral structural feature.

According to some embodiments of the method, a diameter of a beam of the pump pulse is about equal to, or greater than, a lateral extent of the lateral structural feature.

According to an aspect of some embodiments, there is provided a method for depth-profiling of samples. The method includes operations of:

Providing a sample including a target region. The target region includes a lateral structural feature.

Projecting an optical pump pulse on the sample, such as to produce an acoustic pulse, which propagates within the target region of the sample. A wavelength of the pump signal is at least about two times greater than a lateral extent of the lateral structural feature along at least one lateral direction.

Projecting an optical probe signal on the sample, such that the probe signal successively undergoes Brillouin scattering off the acoustic pulse at a plurality of depths within the target region.

Detecting a scattered component of the probe signal to obtain a measured signal.

Analyzing the measured signal to obtain a depth-dependence of at least one parameter characterizing the lateral structural feature.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

FIG. 3 presents a flowchart of a method for depth-profiling of samples characterized by lateral structural variation, according to some embodiments.

FIG. 6A presents a schematic perspective view of a sample, which according to some embodiments corresponds to a vertical-NAND stack, and which may be depth-profiled using the methods and systems of the present disclosure, according to some embodiments thereof;

FIG. 6B presents a cross-sectional view of the sample of FIG. 6A, according to some embodiments;

FIGS. 7B-7E schematically depict four stages, respectively, in a depth-profiling of the sample of FIG. 7A, according to some embodiments;

FIG. 8 presents results of simulations of an implementation of the method of FIG. 3 with respect to a sample including an array of vertical holes, according to some embodiments; shown is an extracted (measured) signal obtained as a result of scattering probe pulses off acoustic pulses at a range of depths within the sample;

FIGS. 9A-9E present results of simulations of five implementations of the method of FIG. 3 with respect to five samples, respectively, according to some embodiments; each sample includes an array of vertical holes; shown are estimated average depth-dependencies of respective radii of the holes as a function of depth;

FIGS. 10A-10E depict cross-sectional views of the samples of FIGS. 9A-9E, respectively, according to some embodiments;

FIGS. 11A-11C present results of simulations of three implementations of the method of FIG. 3 with respect to three samples, respectively, according to some embodiments; each sample includes an array of vertical holes; shown are estimated average depth-dependencies of respective radii of the holes as a function of depth;

FIGS. 14A-14E present results of simulations of five implementations of the method of FIG. 3 with respect to five samples, respectively, according to some embodiments; each sample includes a plurality of parallel of fins; shown are estimated average depth-dependencies of widths of the fins as a function of depth; and FIGS. 15A and 15B present results of simulations of two implementations of the method of FIG. 3 with respect to the sample of FIG. 13, respectively, according to some embodiments; shown are distributions of intensities of the probe pulses; the two simulations differ in the polarizations of the probe pulses and pump pulses.

DETAILED DESCRIPTION

Figure 1A:
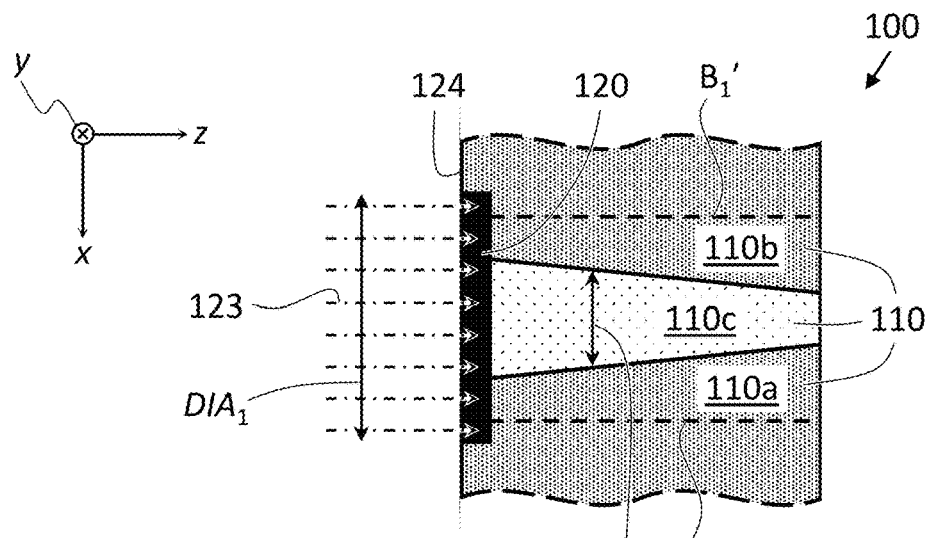
FIG. 1A-1C schematically depict three stages, respectively, in depth-profiling of a sample characterized by lateral structural variation, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "substantially" may be used to specify that a first property, quantity, or parameter is close or equal to a second or a target property, quantity, or parameter. For example, a first object and a second object may be said to be of "substantially the same length", when a length of the first object measures at least 80% (or some other pre-defined threshold percentage) and no more than 120% (or some other pre-defined threshold percentage) of a length of the second object. In particular, the case wherein the first object is of the same length as the second object is also encompassed by the statement that the first object and the second object are of "substantially the same length".

According to some embodiments, the target quantity may refer to an optimal parameter, which may in principle be obtainable using mathematical optimization software.

Accordingly, for example, a value assumed by a parameter may be said to be "substantially equal" to the maximum possible value assumable by the parameter, when the value of the parameter is equal to at least 80% (or some other pre-defined threshold percentage) of the maximum possible value. In particular, the case wherein the value of the parameter is equal to the maximum possible value is also encompassed by the statement that the value assumed by the parameter is "substantially equal" to the maximum possible value assumable by the parameter.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

For ease of description, in some of the figures a three-dimensional cartesian coordinate system (with orthogonal axes x, y, and z) is introduced. It is noted that the orientation of the coordinate system relative to a depicted object may vary from one figure to another. Further, the symbol ⊙ may be used to represent an axis pointing "out of the page", while the symbol ⊗ may be used to represent an axis pointing "into the page".

Referring to the figures, in block diagrams and flowcharts, optional elements and operations, respectively, may appear within boxes delineated by a dashed line.

The present disclosure advantageously expands the picosecond ultrasonics technique to allow for three-dimensional probing of samples, such as semiconductor devices, characterized by one or more (physical) properties, which may vary along one or more lateral directions. The manner in which the properties vary may be depth dependent. Thus, the present disclosure generalizes the picosecond ultrasonics technique to allow obtaining not only one-dimensional structural information regarding a probed structure but also two and three-dimensional structural information. In particular, the methods and systems of the present disclosure advantageously allow for three-dimensional probing of nanostructures within a sample (e.g. a wafer), which are positioned too deeply within the sample, or extend too deeply into the sample, to allow probing thereof using a scanning electron microscope.

More specifically, the present disclosure expands the picosecond ultrasonics technique to allow for depth-profiling of one or more "lateral structural features". That is, structural features whose geometries, densities, and/or material compositions, for example, vary along at least one lateral dimension, and whose lateral extent may be as small as 5 nm (at least along one lateral direction). In particular, the methods and systems of the present disclosure enable estimating a depth-dependence of one or more parameters parameterizing a lateral structural feature (e.g. one or more parameters characterizing the variation in geometry and/or density along one or more lateral directions).

Figure 1B:
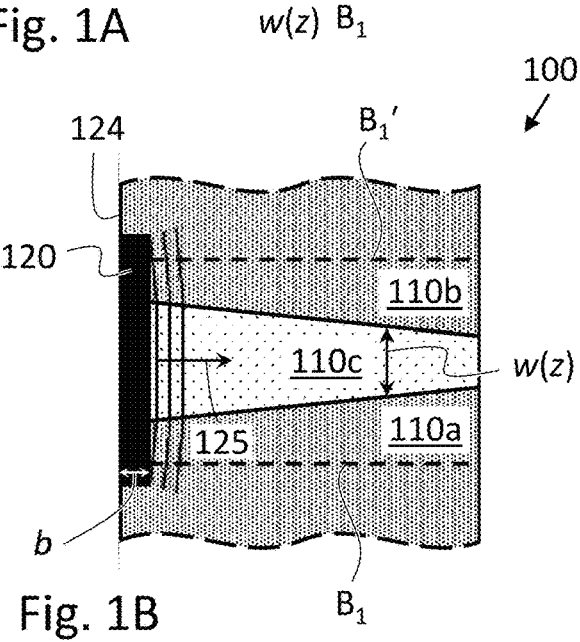
Figure 1C:
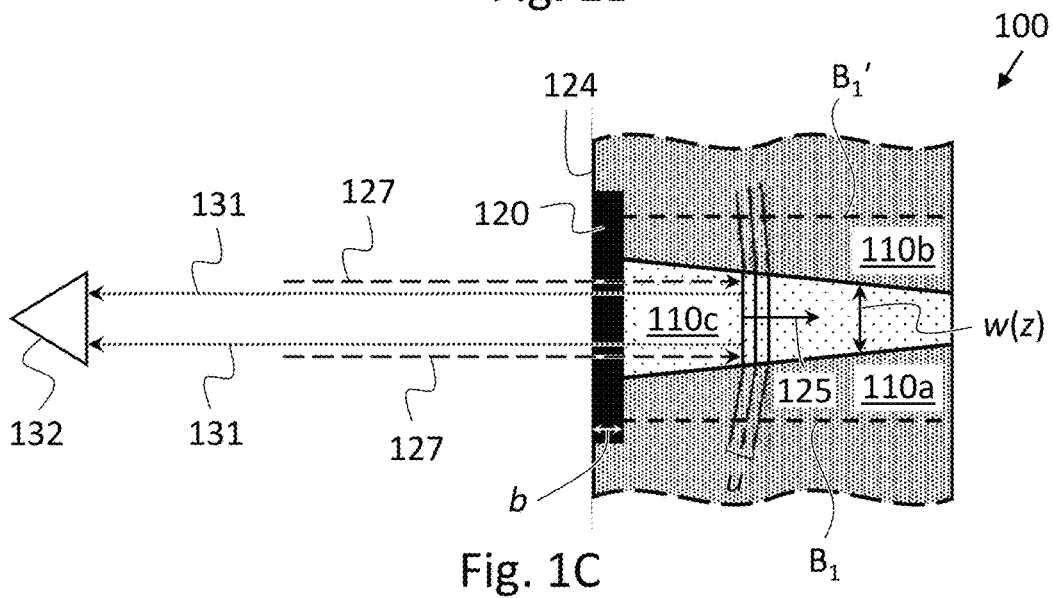

As a non-limiting example, intended to render the exposition more concrete, FIGS. 1A-1C schematically depict different stages, respectively, in depth-profiling of a sample 100 (e.g. a semiconductor device) characterized by lateral structural variation in the sense of including a lateral structural feature, according to some embodiments of the present disclosure. More precisely, a target region 110 of sample 100 is depicted. A dashed line $B_1$ indicates a first (lower, as depicted in the figure) boundary of target region 110 and a dashed line $B_1'$ indicates a second (upper, as depicted in the figure) boundary of target region 110. Target region 110 includes three adjacent subregions: a first side-subregion 110a, a second side-subregion 110b, and a mid-subregion 110c. Mid-subregion 110c is positioned between first side-subregion 110a and second side-subregion 110b. Side-subregions 110a and 110b may, for example, correspond to a first solid medium, characterized by a first refractive index, while mid-subregion 110c may, for example, correspond to a second solid medium, characterized by a second refractive index, which differs from the first refractive index.

Additionally, or alternatively, according to some embodiments, the first solid medium and the second solid medium may be characterized by a different speed of sound. In this regard, it is noted that for implementing the depth-profiling methods disclosed herein, it is sufficient that at least one of the refractive index and the speed of sound varies across the target region.

According to some alternative embodiments, not depicted in FIGS. 1A-1C, mid-subregion 110c may constitute a void.

While FIGS. 1A-1C present two-dimensional views of target region 110, taken along the zx-plane, to facilitate the description, target region 110 is assumed to be uniform along the y-axis up to fabrication imperfections. Hence, FIGS. 1A-1C effectively fully depict target region 110.

In FIGS. 1A-1C, the width of mid-subregion 110c decreases as the z-coordinate is increased. Thus, the structure of target region 110 exhibits not only lateral (i.e. transverse) variation (or dependence) but also longitudinal variation. In other words, the geometry of target region 110 varies not only along the x-axis but also along the z-axis (for some ranges of values of x). More specifically, as target region 110 is traversed in parallel to the x-axis from the first boundary thereof, indicated by dashed-line $B_1$, to the second boundary thereof, indicated by dashed-line $B_1'$, the material composition thereof changes twice. In this sense the structure of target region 110 may be said to include a lateral structural feature. More specifically, the lateral structural feature is constituted by the change from the first medium (characterized by a first refractive index) to the second medium (characterized by a second refractive index) and back again to the first medium, as target region 110 is traversed in parallel to the x-axis.

The shape of mid-subregion 110c may be estimated utilizing the methods and systems disclosed herein. More precisely, a depth-dependence (i.e. a dependence on the z-coordinate) of a width (indicated by w(z)) of mid-subregion 110c may be estimated utilizing the disclosed methods and systems. In this sense, the disclosed methods and systems are said to allow for depth-profiling of a sample (e.g. a semiconductor device). In particular, the present disclosure teaches how to estimate the depth-dependence of a parameter characterizing a lateral structural feature. In FIGS. 1A-1C, a natural choice for the parameter is the width (indicated by w(z)) of mid-subregion 110c. Thus, utilizing the methods and systems of the present disclosure the function w(z) may be evaluated.

Target region 110 further includes a lateral absorption layer 120. According to some embodiments, and as depicted in FIGS. 1A-1C, absorption layer 120 is positioned adjacently to an external surface 124 of sample 100. Referring to FIG. 1A, a pump pulse 123 (e.g. a laser pulse) is projected on external surface 124 on an area thereof adjacent to absorption layer 120. Pump pulse 123 is configured to be absorbed in absorption layer 120, and thereby heat absorption layer 120. It is noted that a (lateral) area of absorption layer 120 is dependent on a beam width $DIA_1$ (i.e. the beam diameter; indicated by a double-headed arrow) of pump pulse 123. The increase of temperature (of absorption layer 120) induces a mechanical strain(s) in absorption layer 120, resulting in the production of an acoustic pulse 125 (shown in FIGS. 1B and 1C). Acoustic pulse 125 propagates away from external surface 124 and into the depth of target region 110.

As acoustic pulse 125 propagates within target region 110, acoustic pulse 125 temporarily locally modifies the density distribution across the segment whereat the acoustic pulse is momentarily localized. This in turn leads to a temporary modification in the refractive index due to the elasto-optic effect. These changes in the refractive index may be sensed through Brillouin scattering. More specifically and as elaborated on below, a series of probe pulses may be scattered off a series of acoustic pulses (such as acoustic pulse 125), each at a respective depth, and respective (backward) scattered component of the probe pulses may be detected to obtain a plurality of measured signals. The plurality of measured signals may be analyzed to reveal structural information about a probed structure, such as, for example, the width w(z) of mid-subregion 110c The beam diameter of pump pulse 123 may be greater than, or at least equal to, a maximum width of mid-subregion 110c, or in mathematical terms $DIA_1 \geq w_{max}$, wherein $w_{max} = \max_z[w(z)]$ (i.e. the maximum value assumable by w(z)). This in turn implies that a lateral extent of acoustic pulse 125 is at least about equal to the maximum width of mid-subregion 110c, which in this case may constitute the lateral extent (i.e. maximum lateral extent) of the lateral structural feature. From optical diffraction limit considerations, to produce a well-defined beam, a wavelength of pump pulse 123 cannot be smaller than about $2 \cdot DIA_1$. Therefore, the wavelength of pump pulse 123 may be greater than, or about equal to, $2 \cdot w_{max}$.

While in FIGS. 1A-1C, the width of target region 110 is depicted as greater than the maximum width of mid-subregion 110c (i.e. $w_{max}$), it is to be understood that the width of target region 110 may be selected to be more narrow. In particular, the width of target region 110 may be selected to be equal to $w_{max}$ (by selecting the beam diameter of pump pulse 123 to be equal to $w_{max}$).

Referring to FIG. 1C, a probe pulse 127 (e.g. a laser pulse) is projected on external surface 124 on an area thereof adjacent to absorption layer 120. Probe pulse 127 is configured to penetrate into target region 110, such as to undergo Brillouin scattering off acoustic pulse 125 (within target region 110). Further indicated is a scattered component 131 of probe pulse 127, which is (Brillouin) scattered backwards off acoustic pulse 125. Scattered component 131 may be detected by a (light) detector 132 to produce a corresponding measured signal.

The depth (or, what amounts to the same thing, the z-coordinate) at which the target region is probed is determined by the depth at which probe pulse 127 "engages" acoustic pulse 125, i.e. undergoes (Brillouin) scattering therefrom. By controlling a time-delay Δt between the launch of pump pulse 123 and the launch of probe pulse 127, the z-coordinate at which the probing occurs may be selectively controlled. By implementing the above-described operations at different time-delays Δt, target region 110 may be probed at a plurality of corresponding depths, and, in particular, all along the depth dimension of target region 110. In this way, a plurality of measured signals may be obtained, corresponding to a to a plurality of (probed) depths.

As described in detail below in the Methods subsection, the plurality of measured signals may be analyzed to evaluate (estimate) w(z), or, in other words, the dependence of the width of mid-subregion 110c on the depth.

It is noted that the measurement resolution along the z-axis is determined by a width u of acoustic pulse 125, which in turn may be determined by a thickness b (indicated in FIGS. 1B and 1C) of absorption layer 120, as discussed in more detail below in the Methods subsection. According to some embodiments, u may advantageously be as small as about 10 nm.

Figure 4:
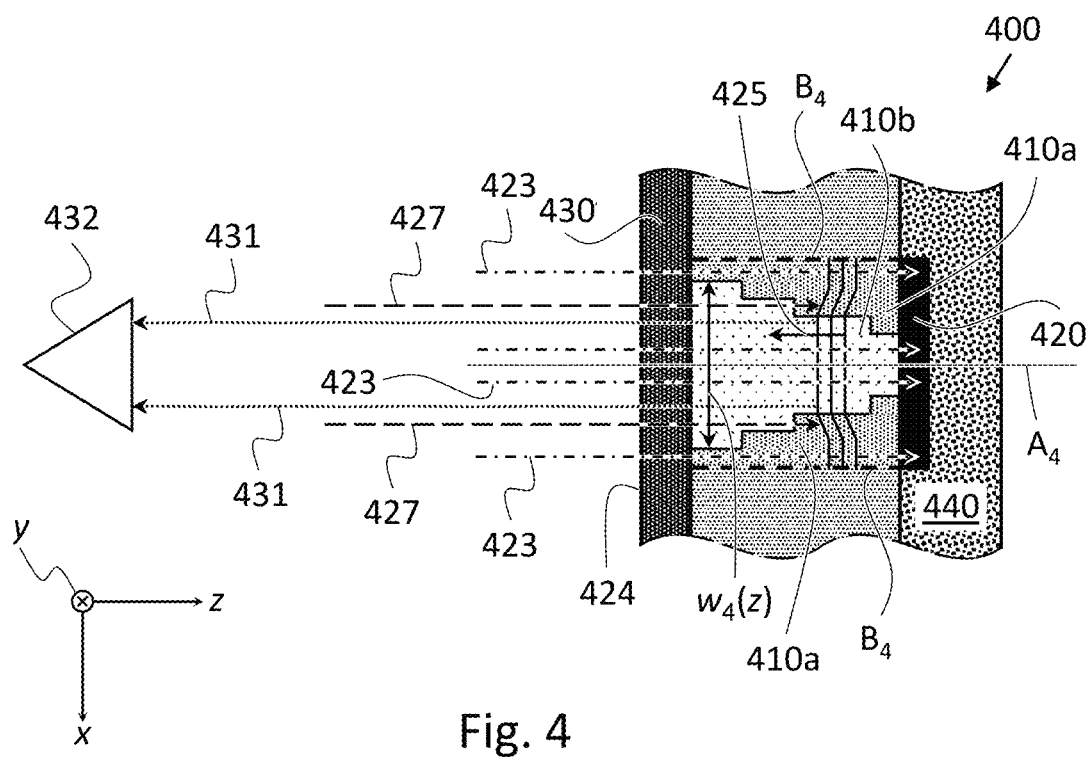
FIG. 4 schematically depicts depth-profiling of a sample characterized by lateral structural variation, according to some embodiments.
Figure 5:
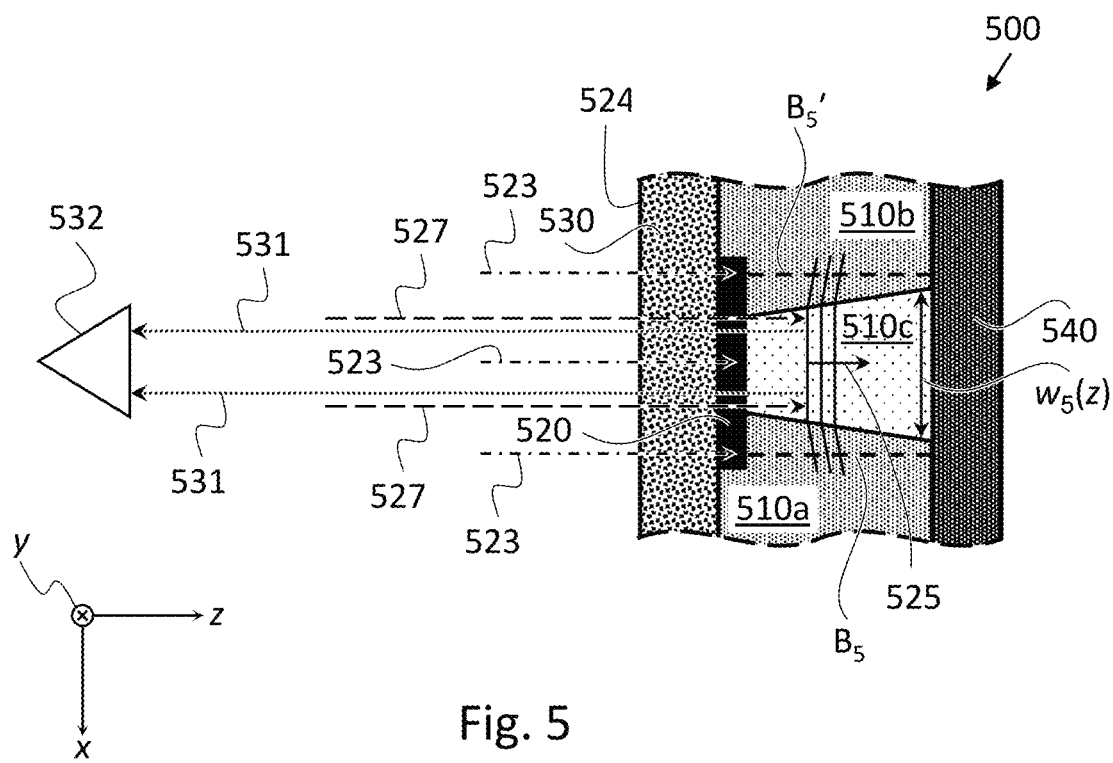
FIG. 5 schematically depicts depth-profiling of a sample characterized by lateral structural variation, according to some embodiments.

Finally, it is noted that while in FIGS. 1A-1C absorption layer 120 is shown as being adjacent to external surface 124 of sample 100, other options are in general possible, as depicted, for example, in FIGS. 4 and 5. In particular, according to some embodiments, the absorption layer may be fully embedded within the sample region and/or positioned outside the target region.

As used herein, according to some embodiments, the term "lateral structural feature" refers to a structure which laterally varies along at least one (lateral) direction in the sense that along that direction a value of at least one parameter characterizing the structure is not constant. A lateral structural feature may manifest, for example, as a change in one or more of a geometry, material composition, media, mass density, density of embedded elements and/or voids, spatial arrangement of embedded elements and/or voids, doping concentration(s) (i.e. density of doping impurities), which in turn manifests as a change in the refractive index, and/or the speed of sound, along at least one lateral direction. Variations in optical properties such as, for example, variations in birefringence and/or optical anisotropy (i.e. the dependence of the of refractive index on the polarization and/or propagation direction of light therein) along at least one lateral direction may also constitute a lateral structural feature in the sense described above.

It is noted that a lateral structural feature may vary along two lateral directions or only along a single lateral direction. The disclosed methods and systems allow for depth-profiling in both cases. FIG. 4 and FIGS. 6A-6G depict examples of lateral structural features which laterally vary along two (lateral) directions. FIGS. 1A-1C, FIG. 5, and FIGS. 7A-7E depict examples of lateral structural features, which (up to fabrication imperfections) laterally vary only along a single direction (namely, in parallel to the x-axis).

Generally, a target region is selected to fully include a lateral structural feature. If the lateral structural feature forms part of a greater feature, which extends beyond the target region, variation of the greater feature outside the target region is not probed (and does not affect the classification of the lateral structural feature as varying along one or two lateral directions). Else the size of the target region may be increased (by increasing the beam width of the pump and probe pulses) to fully include the greater feature.

As used herein, according to some embodiments, the term "lateral extent" with reference to a lateral structural feature, which laterally varies along two lateral directions, may refer to a maximal lateral extent of the feature (wherein the maximum is taken over the depth dimension). For example, the lateral extent of a (circular) cylinder, whose symmetry axis is parallel to the longitudinal direction, is the diameter of the cylinder, while the lateral extent of a conical frustum, whose symmetry axis is parallel to the longitudinal direction, is the greater of its two diameters. The lateral extent of an elliptical cylinder (i.e. a cylinder whose lateral cross-section defines an ellipse), whose symmetry axis is parallel to the longitudinal direction, is the greater of the two diameters of the ellipse.

According to some embodiments, the term "lateral extent" with reference to a lateral structural feature, which laterally varies only along a single lateral direction, may refer to a maximal extent of the feature along that lateral direction (wherein the maximum is taken over the depth dimension). According to some embodiments, the term "lateral extent" with reference to a lateral structural feature, whose rate of a change along a first lateral direction is significantly greater than along a second lateral direction may refer to a maximal extent of the feature along the first lateral direction.

According to some embodiments, the term "lateral extent" with reference to a lateral structural feature, which laterally varies along two lateral directions, may refer to a maximal extent of the feature along a specific lateral direction, irrespective of whether the maximal extent of the feature along another lateral direction may be greater. This may be the case, for example, in embodiments wherein the lateral structural feature is sought to be depth-profiled only along one lateral direction.

Systems

Figure 2:
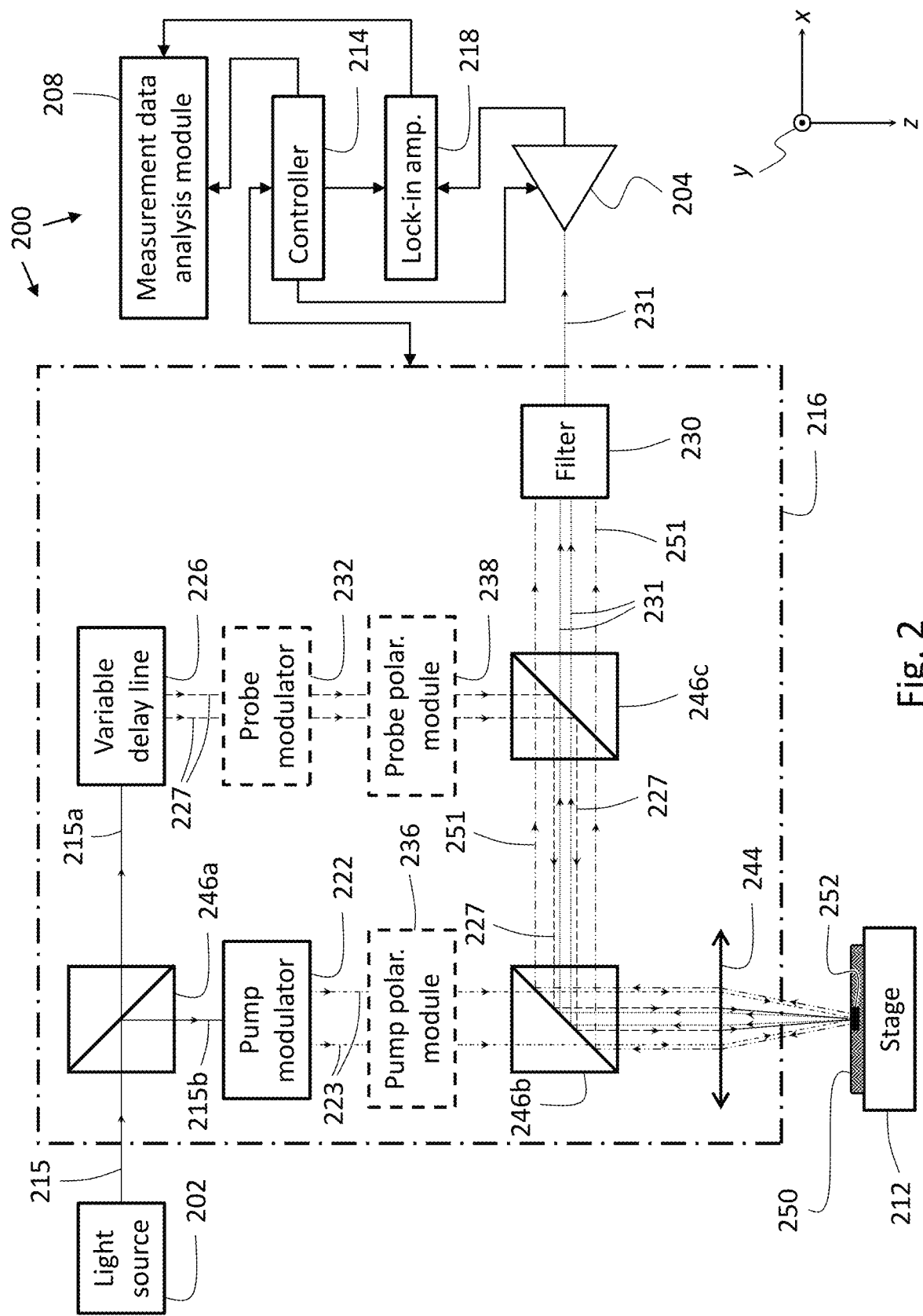
FIG. 2 schematically depicts a computerized system for depth-profiling of samples characterized by lateral structural variation, according to some embodiments.

FIG. 2 schematically depicts a computerized system 200 for depth-profiling of samples, such as semiconductor devices and structures, according to some embodiments. System 200 includes a light source 202, a detector 204 (a light sensor), a measurement data analysis module 208, a stage 212, a controller 214, optical equipment 216, and a lock-in amplifier 218. Light source 202 may be a coherent light source, such as a laser source (i.e. a laser generator). Optical equipment 216 may include a pump modulator 222, a variable delay line 226, a filter 230 (e.g. an optical filter), and, optionally, one or more of a probe modulator 232, a pump polarization module 236, and/or a probe polarization module 238. Optical equipment 216 may further include an objective lens 244 and a plurality of beam splitters 246: a first beam splitter 246a, a second beam splitter 246b, and a third beam splitter 246c.

Light source 202, detector 204, stage 212, and optical equipment 216 constitute, or form part of, an optical setup (not numbered) of system 200.

Stage 212 is configured to have placed thereon a sample, such as a sample 250 (e.g. a semiconductor device or structure). Also indicated is a target region 252 in sample 250, which is to be probed (i.e. depth-profiled). As elaborated on below, target region 252 may include a lateral structural feature (not shown in FIG. 2). That is, a structure, which varies along at least one lateral direction (i.e. in parallel to the xy-plane), in the sense that along that direction, a value of at least one parameter characterizing the structure is not constant. According to some embodiments, the structure of target region 252 may further vary along the longitudinal direction (i.e. along the z-axis, which quantifies the depth). According to some embodiments, target region 252 may include a plurality of the lateral structural feature (i.e. a plurality of same lateral structural features), which constitute a composite a lateral structural feature. According to some such embodiments, the plurality of the lateral structural feature constitutes a repeating lateral structural pattern (i.e. a composite lateral structural feature, which is periodic).

According to some embodiments, target region 252 may include a plurality of different lateral structural features. According to some embodiments, a plurality of lateral structural features, particularly when not arranged periodically, may be collectively considered as a single lateral structural feature.

Controller 214 may be functionally associated with each of light source 202, detector 204, stage 212, optical equipment 216, and lock-in amplifier 218. More specifically, controller 214 is configured to control and synchronize operations and functions of the above-listed modules and components—particularly those of optical equipment 216—during depth-profiling of a sample. For example, controller 214 may set a sequence of time-delays, which are imposed by variable delay line 226, such that the minimum time-delay allows probing target region 252 at maximum depth and the maximum time-delay allows probing target region 252 at minimum depth.

According to some embodiments, stage 212 may be movable, at least along one or more lateral directions, thereby allowing depth-profiling of different target regions in sample 250. According to some embodiments, stage 212 may be configured to allow monitoring and controlling the temperature of a sample placed thereon. For example, according to some embodiments, a sample-placement surface of stage 212 (i.e. the top surface of stage 212) may be controllably cooled (and optionally also heated).

In operation, light source 202 may produce a laser beam 215 (e.g. a laser pulse) directed at first beam splitter 246a. According to some embodiments, laser beam 215 may be a laser pulse or may include a series of pulses. A first sub-beam 215a, also referred to as a probe pulse 227, indicates the portion of laser beam 215 that is passed through first beam splitter 246a. A second sub-beam 215b indicates the portion of laser beam 215 that is reflected off first beam splitter 246a towards pump modulator 222. Second sub-beam 215b is modulated by pump modulator 222, thereby preparing a pump pulse 223 (indicated by dashed-dotted arrows), as elaborated on below. Pump pulse 223 travels from pump modulator 222 towards objective lens 244 (via second beam splitter 246b) and is focused thereby on sample 250. Pump pulse 223 is configured to be absorbed by an absorption layer (not shown in FIG. 2) of sample 250 and thereby generate an acoustic pulse (not shown in FIG. 2), essentially as described in the description of FIGS. 1A-1C and as further elaborated on below. Some possible configurations of target regions and absorption layers in samples are depicted in FIGS. 1A-1C, 4, and 5, as well as in FIGS. 6A-6G and 7A-7E.

According to some embodiments, pump modulator 222 may be configured to modulate a waveform of second sub-beam 215b, such that pump pulse 223 is characterized by a pump carrier (i.e. carrier wave) and a pump envelope: The pump carrier may be configured (e.g. is characterized by a wavelength) to facilitate penetration of pump pulse 223 into the sample, and—when the absorption layer is fully embedded within sample (as depicted, for example, in FIGS. 4 and 5)—propagation therein onto the absorption layer, as well as absorbance of pump pulse 223 within the absorption layer, as described below in the Methods subsection. The pump envelope may be configured to facilitate the separation of a scattered component of the probe pulse from background signals and noise, thus improving detection. According to some such embodiments, pump modulator 222 may include a frequency-doubler (not shown).

According to some embodiments, a portion of pump pulse 223 may be returned from sample 250 (due to one or more scattering and/or reflection mechanisms). Such a returned component 251 of pump pulse 223 is indicated in FIG. 2 by dashed-double-dotted arrows. Returned component 251 may be substantially filtered out by filter 230, as elaborated on below.

According to some embodiments, wherein optical equipment 216 further includes pump polarization module 236 (e.g. a polarization filter whose polarization angle is controllable), pump polarization module 236 may be used to modify the polarization of pump pulse 223 (e.g. from circular polarization to linear polarization), such as to maximize, or substantially maximize, the absorption of pump pulse 223 within the absorption layer (as described, for example, in the description of FIGS. 7A and 7B), and thereby increase the magnitude of the Brillouin oscillations, potentially facilitating extraction thereof by measurement data analysis module 208.

From first beam splitter 246a probe pulse 227 (i.e. first sub-beam 215a) travels to variable delay line 226. Variable delay line 226 is configured to delay probe pulse 227 for a time interval, which may be controllably selected, as elaborated on below. According to some embodiments, from variable delay line 226, the delayed probe pulse 227 (indicated by dashed arrows) continues to third beam splitter 246c. According to some embodiments, and as depicted in FIG. 2, on the way to third beam splitter 246c probe pulse 227 may pass through probe modulator 232. In such embodiments, probe pulse 227 may be modulated by probe modulator 232, according to a modulation signal received from controller 214. According to some embodiments, and as depicted in FIG. 2, probe pulse 227 may further pass through probe polarization module 238 (e.g. a polarization filter whose polarization angle is controllably selectable).

Probe pulse 227 is reflected from third beam splitter 246c towards second beam splitter 246b. From second beam splitter 246b probe pulse 227 is reflected towards objective lens 244, which focuses probe pulse 227 on sample 250. As elaborated on below, probe pulse 227 is configured to penetrate sample 250 and enter into target region 252, such as to be scattered off the acoustic pulse at a depth within target region 252, which is determined by the delay-time imposed by variable delay line 226. More specifically, variable delay line 226 may be configured to controllably increase the optical path length of probe pulse 227 (e.g. using mirrors), thereby increasing the travel time thereof, with the result that probe pulse 227 arrives at sample 250 at a controllable time delay relative to pump pulse 223. Also indicated is a (backward) scattered component 231 of probe pulse 227 (resulting from the scattering thereof off the acoustic pulse).

According to some embodiments, wherein optical equipment 216 further includes probe polarization module 238, probe polarization module 238 may be utilized to modify the polarization of probe pulse 227, such as to maximize, or substantially maximize, an intensity of scattered component 231 of probe pulse 227.

Filter 230 may be configured to transmit therethrough scattered component 231 while simultaneously filtering out noise and/or blocking returned component 251. According to some embodiments, filter 230 is, or includes, an optical filter, and a wavelength of pump pulse 223 and a wavelength of probe pulse 227 may be selected such that a wavelength characterizing returned component 251 and a wavelength characterizing scattered component 231 differ, thereby allowing transmission of scattered component 231 through filter 230 and blocking of returned component 251 thereby. More generally, according to some embodiments, waveforms of pump pulse 223 and probe pulse 227 are selected such as to allow employing an optical filter to discriminate there between. According to some embodiments, rays of scattered component 231 and rays of returned component 251, arriving at filter 230, may be oriented along two different directions (or two distinct ranges of angles). In such embodiments, filter 230 may be, or also include, an angular filter (i.e. allowing light, arriving only in specific incidence angles, to be transmitted therethrough).

According to some embodiments, which include probe polarization module 238, and, optionally, pump polarization module 236, filter 230 may be, or include, a polarization filter. In such embodiments, a polarization of probe pulse 227, and, optionally, a polarization of pump pulse 223, may be selected such as to allow transmission of scattered component 231 through filter 230 and blocking, or substantial blocking, of returned component 251.

Detector 204 is configured to detect the output of filter 230 (i.e. scattered component 231 after transmission thereof through filter 230) to obtain a measured signal. The measured signal may be relayed to lock-in amplifier 218. Lock-in amplifier 218 is configured to receive from controller 214 the modulation signal, employed by pump modulator 222 in the preparation of pump pulse 223. Lock-in amplifier 218 uses the modulation signal to obtain an extracted (i.e. FM demodulated) signal in which the contribution to the measured signal due to scattered component 231 is amplified (and background signals and noise are suppressed). The extracted signal essentially represents deviations from a baseline signal (which would be obtained in the absence of the pump pulse). As such, the extracted signal corresponds to the Brillouin oscillations due to the scattering of the probe pulse off the acoustic pulse (which, in turn, is produced by the pump pulse).

In order to estimate the depth-dependence of the lateral structure feature (e.g. in order to estimate w(z) in specific embodiments of sample 250, wherein sample 250 has the structure of sample 100), the above-described sequence of probing operations may be implemented at a plurality of different time-delays, such as to probe the target region at a corresponding plurality of different depths. For each time-delay a respective measured signal $M_r(z)$ is obtained. $M_r(z)$ denotes a measured signal obtained when probe pulse 227 is scattered off the acoustic pulse at a coordinate z (within target region 252). The plurality of measured signals $\{M_r(z)\}$, (e.g. after demodulation) may be analyzed by measurement data analysis module 208 to obtain an estimate of a depth-dependence of the lateral structural feature, as elaborated on below. (It is noted that the same depth may be probed a plurality of times.) The number of measured signals and the corresponding time delays may depend on the longitudinal extension of the target region. As a non-limiting example, according to some embodiments, the time delays may be smaller than about 2 nsec (nanosecond), with a temporal sampling resolution of about 1 psec (picosecond).

Measurement data analysis module 208 includes computer hardware (one or more processors, and volatile as well as non-volatile memory components; not shown). Measurement data analysis module 208 may be configured to receive from lock-in amplifier 218 (e.g. one at a time) the extracted signals corresponding to $\{M_r(z)\}_r$ and to combine the extracted signals into a (single) combined signal ES(z). Measurement data analysis module 208 is further configured to analyze the combined signal, such as to obtain a depth-dependence (or, what amounts to the same thing, dependence on the z-coordinate) of at least one parameter characterizing a lateral structural feature within target region 252.

Further, according to some embodiments, measurement data analysis module 208 may be configured to isolate the elasto-optic contribution to the measured signal from contributions thereto due to other physical effects triggered by the pump pulse. In particular, as elaborated on below in the Methods subsection, measurement data analysis module 208 may be configured to distinguish the elasto-optic contribution to the measured signal from a thermo-optic contribution thereto, based on the different physical characteristics thereof: Using signal processing techniques, the thermo-optic contribution to the (extracted) measured signal may be identified and subtracted therefrom.

According to some embodiments, target region 252 includes a composite lateral structural feature (not shown) composed of a plurality lateral structural features, which up to fabrication imperfections are the same. Further, a size of a beam diameter of probe pulse 227 is selected such as to allow target region 252 to be fully probed. In such embodiments, each of the plurality lateral structural features may contribute—and substantially equally—to the combined signal. The output of measurement data analysis module 208 may then be interpreted as an average depth-dependence of the at least one parameter characterizing the lateral structural features (i.e. wherein the average is taken over all the lateral structural features included in the plurality).

According to some embodiments, measurement data analysis module 208 may be configured to obtain the depth-dependence of the at least one parameter, characterizing the lateral structural feature, based on two or more pluralities of measured signals. Each of the two or more pluralities of measured signals may be respectively obtained for a unique pump pulse-probe pulse combination. According to some embodiments, different pump pulse-probe pulse combinations may vary from one another in one or more optical characteristics selected from: a wavelength of the pump pulse, a waveform of the pump pulse, a polarization of the pump pulse, a wavelength of the probe pulse, a waveform of the probe pulse, and polarization of the probe pulse.

According to some embodiments, wherein the sample is a wafer, system 200 may be configured to perform the above-described sequence of probing operations at different locations on the wafer. Measurement data analysis module 208 may be configured to analyze the obtained pluralities of measured signals to obtain information about process-variations across the wafer.

According to some embodiments, same location(s) on different dies may be probed and the obtained pluralities of measured signals may then be compared to obtain a large-scale map of process variations across the wafer (e.g. as part of a die-to-die variation protocol).

According to some embodiments, different locations on the same die—known to be characterized by the same lateral structural features (such as different regions in a memory array, which share the same architecture) up to fabrication imperfections—may be probed, and the obtained pluralities of measured signals may then be compared to obtain a small-scale map of process variations across a die or one or more regions thereof (e.g. as part of an in-die variation protocol). In this regard, it is noted that the type(s) of deviations from design specification of a lateral structural feature may depend on the density of the lateral structural features (e.g. when the lateral structural features constitute a repeating lateral structural pattern) in a region on a die.

Various ways whereby measurement data analysis module 208 may process measured signals to obtain a depth-dependence of one or more parameters characterizing a lateral structural feature are further described below in the Methods subsection.

According to some embodiments, optical equipment 216 may be configured such that each of pump pulse 223 and probe pulse 227 are incident on sample 250 at a vanishing, or substantially vanishing, angle of incidence (i.e. the angle of incidence is equal to, or substantially equal to, zero).

According to some embodiments, optical equipment 216 may include optical elements configured to allow controllably modifying the angle of incidence of pump pulse 223 and/or probe pulse 227.

According to some embodiments, not depicted in FIG. 2, system 200 may include two light sources: a first light source configured to generate pump pulse 223 and second light source configured to generate probe pulse 227.

Methods

FIG. 3 is a flowchart of a method 300 for depth-profiling of samples, which include one or more lateral structural features, according to some embodiments. Method 300 may be implemented by computerized system 200 or a computerized system similar thereto. Method 300 may include operations of:

An operation 310, wherein a sample is provided. The sample includes a target region, which includes a lateral structural feature.

An operation 320, wherein a plurality of measured signals is obtained by implementing m times:

A sub-operation 320a, wherein an optical pump pulse is projected on the sample, such as to produce an acoustic pulse, which propagates within the target region. A wavelength of the pump pulse is selected to be at least about two times greater than a lateral extent of the lateral structural feature.

A sub-operation 320b, wherein an optical probe pulse is projected on the sample, such that the probe pulse undergoes Brillouin scattering off the acoustic pulse within the target region.

A sub-operation 320c, wherein a scattered component of the probe pulse is detected to obtain a measured signal.

In each of the m implementations, the respective probe pulse is scattered off the acoustic pulse at a respective depth within the target region, such that the target region is probed at a plurality of depths. (For example, according to some embodiments, in an i-th and j-th implementations (i<j≤m), the i-th probe pulse may be scattered at an i-th depth $s_i$ and the j-th probe pulse may be scattered at a j-th depth $s_j \neq s_i$.)

An operation 330, wherein a depth-dependence of at least one parameter characterizing the lateral structural feature is obtained by analyzing at least the plurality of measured signals (obtained in the m implementations of sub-operations 320a-320c).

According to some embodiments, different implementations (from the m implementations) may differ from one another in the time-delay of the respective probe pulse relative to the respective pump pulse but, otherwise, setup parameters (e.g. wavelengths of the pump pulse and the probe pulse, polarizations thereof, and so on) may be the same in each implementation. According to some embodiments, the time-delay may measure the time-interval between the incidence of a pump pulse on the sample and the incidence of a probe pulse on the sample. More specifically, according to some embodiments, the m time-delays may be selected such as to ensure that the probe pulses are scattered off the acoustic pulses at a plurality of depths within the target region: e.g. a first probe pulse (or a first group of probe pulses, e.g. when each depth is probed more than once) is scattered off a first acoustic pulse at a first depth $s_1$, a second probe pulse (or a second group of probe pulses) is scattered off a second acoustic pulse at a second depth $s_2$, and so on, until an m-th probe pulse (or an m-th group of probe pulses) is scattered off an m-th acoustic pulse at an m-th depth $s_m$. According to some embodiments, the m time-delays may be selected such that $s_1 > s_2 > \ldots > s_m$.

In sub-operation 320a, the wavelength of the pump pulse may be selected such as to maximize, or substantially maximize, the absorption of the pump pulse in an absorption layer, such as absorption layer 120 or the absorption layers depicted in FIGS. 4, 5, 6D-6G, and 7C-7E. More precisely, the absorption layer may be understood as a layer in the sample wherein most of the pump pulse is absorbed. The thickness of the absorption layer may depend on the absorption length of the pump pulse in the medium or media from which the region of the sample—wherein the absorption layer located—is composed. Thus, by increasing the absorptivity of the pump pulse (e.g. by suitably changing the wavelength thereof) in the region (wherein the absorption layer is located), the absorption length of the pump pulse within the region—and therefore the thickness of the absorption layer—are decreased. This in turn may lead to an increase in the resolution of the measured signal since the width of the acoustic pulse (which determines the resolution) may be dependent on the thickness of the absorption layer.

The last statement may hold true so long as the duration of the pump pulse is shorter than the formation time of the acoustic pulse (i.e. the thermal expansion time of the absorption layer). Thus, according to some embodiments, the duration of the pump pulse may be selected not to exceed, or substantially not to exceed, the thermal expansion time of the absorption layer. According to some such embodiments, wherein the absorption layer is silicon-based, the duration of pump pulse may be smaller than about 5 psec (picosecond), about 3 psec, or even about 1 psec. Each possibility corresponds to separate embodiments.

It is further noted that the location of the absorption layer may itself be controllable. For example, a sample may include a first portion of a first material and a second portion of a second material, with the second portion being positioned within the first portion. The absorption layer may then be controllably situated in the second portion by selecting a pump pulse characterized by a wavelength such that an absorption length of the pump pulse in the first material is much greater than an absorption length thereof in the second material.

Depending on the composite structure of the sample, the absorption layer may or may not be included in the target region. Different possible locations of absorption layers within a sample are shown in FIGS. 1, 4, 5, 6D-6G, and 7C-7E. According to some embodiments, the absorption layer may constitute, or be included in, a distinct element embedded in or on the target region. The embedded element may be characterized by different absorptive behavior (e.g. different absorption length and/or a different dependence of the absorption length on polarization) than the rest of the target region, thereby allowing to selectively heat the embedded element.

According to some embodiments, wherein the absorption layer is silicon-based, the wavelength of the pump pulse may be in the ultraviolet range (i.e. below 360 nm). According to some embodiments, wherein the absorption layer is metallic, the wavelength of the pump pulse may also be selected from the visible range.

The absorption of the pump pulse within the absorption layer heats the absorption layer, which in turn expands the absorption layer, resulting in the production of one or two acoustic pulses in the sample. More specifically, when the absorption layer is an outermost layer of a sample (on which the pump pulse is directly projected), a single acoustic pulse in the sample may be produced, which propagates away from the absorption layer and into the sample along a perpendicular direction to the absorption layer. When the absorption layer is an inner layer of a sample, two acoustic pulses may be produced, which propagate away from the absorption layer, perpendicularly thereto, and in opposite senses.

The lateral extent of the acoustic pulse may be selected to be greater than the lateral extent of the lateral structural feature. More precisely, to fully probe the target region, the lateral dimensions of the acoustic pulse may be selected to be or greater than, or about equal to, the lateral dimensions of the target region. In turn, the lateral dimensions of the acoustic pulse are determined by the beam diameter of the pump pulse. As explained above, this sets a lower bound on the wavelength of the pump pulse, since the optical diffraction limit constrains the diameter of a laser beam to be greater than about $\lambda/2$, wherein $\lambda$ is the wavelength of the laser beam. Consequently, in sub-operation 320a, the wavelength of the pump pulse is selected to be greater than, or at least about equal to, twice the lateral extent of the lateral structural feature.

According to some embodiments, a depth dimension (also referred to as "longitudinal dimension") of the target region is determined by the propagation direction of the acoustic pulse within the target region.

In sub-operation 320b, the wavelength of the probe pulses may be selected to allow the probe pulses to traverse the target region, thereby allowing to probe the target region in full. More specifically, the wavelength of the probe pulses may be selected such that the absorption length of the probe pulses within the target region is greater than (or at least about equal to) an extent of the target region along the propagation direction of the probe pulse within the target region.

According to some embodiments, the wavelength of the probe pulses is selected to be at least about two times greater than the lateral extent of the lateral structural feature.

According to some embodiments, different probe pulses, which are configured to be scattered off the acoustic pulse at different depths, respectively, may be characterized by different wavelengths, and, more generally, waveforms and/or polarizations. Such a dependence of the probe pulse wavelength (or waveform and/or polarization) on the scattering depth may be implemented using a probe modulator (e.g. probe modulator 232) when the target region includes different types of layers (e.g. lateral layers), which are respectively characterized by different refractive indices and/or speeds of sound (e.g. due to different material composition or internal geometry). In particular, this may allow selectively probing each type of layer.

As used herein, according to some embodiments, the absorption length of a specimen (e.g. a bulk of material or a composite structure including a plurality of parts made of different materials and optionally characterized by different geometries) is defined as the distance over which an intensity of a light beam entering the specimen drops to about 1/e 63%) of the intensity thereof upon entry into the bulk. As used herein, according to some embodiments, the terms "sample" and "specimen" may be used interchangeably.

It is noted that the absorption length of a composite specimen may depend not only the absorption lengths of each of the parts making up the specimen, but also on geometries of the parts and the spatial arrangement thereof with respect to one another. Thus, for example, a specimen including alternating layers of two different materials, such that each of the two materials is transparent or substantially transparent to radiation at a continuous range of wavelengths, may nevertheless be reflective to radiation at a specific wavelength within the range.

According to some embodiments, the probe pulses may be linearly polarized. In particular, according to some embodiments, and as described below in the description of FIG. 6G, the probe pulses may be linearly polarized such as to increase the measurement sensitivity along a selected lateral direction. According to some embodiments, the polarization of the pump pulses may be selected such as to increase the absorbance thereof in the absorption layer. In this respect, the geometry of the absorbing layer may play a significant role. For example, when the absorption layer includes a plurality of parallel strips (as depicted, for example, in FIGS. 7C-7E), the polarization of the pump pulses may be selected to be parallel to the strips.

According to some embodiments, particularly embodiments wherein the sample includes a composite lateral structural feature (whether periodic or not) composed of a plurality of a same lateral structural feature, the lateral structural features, making up the plurality, may be simultaneously depth-profiled. In such embodiments, the target region is selected to include the plurality of the lateral structural feature, by accordingly selecting the beam width of the pump pulses (which define the lateral area of the target region). The beam width of the probe pulses may be set to the beam width of the pump pulses, thereby ensuring that the lateral extent of the target region is fully probed (so that all of the lateral structural features in the plurality are probed). From optical diffraction limit considerations, the wavelength of the pump pulses is selected to be at least about two times greater than the lateral extent of the composite lateral structural feature. Similarly, the wavelength of the probe pulses is selected to be at least about two times greater than the lateral extent of the composite lateral structural feature. The obtained plurality of measured signals then manifests the average depth-dependence of the parameters characterizing the lateral structural features in the plurality. According to some such embodiments, the composite lateral structural feature is periodic.

According to some embodiments, in operation 320, the temperature of the sample may be regulated, such as to ensure that at the start of each of the m implementations, the temperature of the sample is the same, and, optionally, equal to a pre-determined temperature.

In operation 330, a plurality of measured signals $\{M_r'(s)\}_r$, obtained in the m implementations of operation 320, may be demodulated and combined to obtain a single (combined) signal ES'(s). Here s denotes depth within the target region. $M_r'(s)$ denotes a measured signal obtained for a probe pulse scattered off an acoustic pulse at depth s. It is noted that for a given depth s, $\{M_r'(s)\}_r$ may generally include a plurality of measured signals obtained at the depth s.

As a non-limiting—and purposefully simplified—example intended to render the discussion clearer, a plurality of measured signals $\{M_r''(s)\}_{r=1, 2}$, including two measured signals $M_1''(s_A)$ and $M_2''(s_B)$, is considered. (Typically, a plurality of measured signals may include anywhere between about 10 to about 1000 measured signals.) The measured signals $M_1''(s_A)$ and $M_2''(s_B)$ are assumed to have been obtained by scattering a probe pulse off an acoustic pulse at depths $s_A$ and $s_B > s_A$, respectively. From the two measured signals $M_1''(s_A)$ and $M_2''(s_B)$ two extracted signals $E_{S_A}$ and $E_{S_B}$ may be obtained (e.g. using a lock-in amplifier) in which background signals and noise are suppressed, as described above in the description of system 200. The two extracted signals may be combined into a single combined signal ES''(s), wherein for $s_A - \frac{1}{2} \cdot \Delta s \leq s \leq s_A + \frac{1}{2} \cdot \Delta s$ ES''(s)=$E_{S_A}$ and for $s_B - \frac{1}{2} \cdot \Delta s \leq s \leq s_B + \frac{1}{2} \cdot \Delta s$ ES''(s)=$E_{S_B}$. Here $\Delta s$ may correspond to the thickness of the layers probed by the probe pulses at each of the two depths. Further, it is implicitly assumed that $s_A + \frac{1}{2} \cdot \Delta s \leq s_B - \frac{1}{2} \cdot \Delta s$.

The depth s at which the scattering occurred can be related to the scattering time based on the time delay $\Delta t$ (of the probe pulse relative to the pump pulse), the formation time of the acoustic pulse $t_F$, and the propagation velocity of the acoustic pulse in the target region. The formation time $t_F$ is the time it takes for the acoustic pulse to form once the absorbing layer has been irradiated by the pump pulse. The propagation velocity of the acoustic pulse equals the speed of sound $v_{sound}$. (As elaborated on below, in non-uniform media, the speed of sound may be dependent on the depth, in which case the functional dependence thereof on the depth may be taken into account.)

According to some embodiments, s itself may linearly, or substantially linearly, depend on the time-delay $\Delta t$. According to some such embodiments, for example, wherein the absorption layer is positioned adjacently to the target region but deeper within the sample than the target region (e.g. as shown in FIGS. 6D-6G), $s=D-v_{sound} \cdot (\Delta t - t_F)$. D is the depth dimension or longitudinal extent of the target region. Thus, for the minimum delay-time (i.e. $\Delta t = t_F$) s=D and the target region is probed at maximum depth. For the maximum delay-time (i.e. $\Delta t = t_F + D/v_{sound}$) s=0, and the target region is probed at zero depth. According to some alternative embodiments, for example, wherein the absorption layer forms the least deep layer of the target region (e.g. as shown in FIGS. 6D-6G), $s=v_{sound} \cdot (\Delta t - t_F)$. Thus, for the minimum delay-time (i.e. $\Delta t = t_F$) s=0 and the target region is probed at minimum depth. For the maximum delay-time (i.e. $\Delta t = t_F + D/v_{sound}$) s=D, and the target region is probed at maximum depth.

According to some embodiments, as part of the analysis in operation 330, the combined signal may be compared to another signal, which is measured in the absence of an acoustic pulse (i.e. when no pump pulse is projected on the sample). The comparison allows isolating the contribution of the acoustic pulses to the combined signal, and thereby facilitates extracting the Brillouin oscillations resulting from the interactions between the probe pulses and the acoustic pulses.

According to some embodiments, the production of the acoustic pulse(s) in a target region (due to the expansion of an absorbing layer) may be accompanied by a change in the refractive index of the target region (or a part thereof) that is due to the thermo-optic effect—i.e. the change in the refractive index of a medium due to a change(s) in temperature in the medium. The changes in reflectivity induced by acoustic pulses and due to the thermo-optic effect, and, in particular, the relative strength thereof, depend on the physical properties of the medium.

According to some embodiments, operation 330 may include a sub-operation wherein the thermo-optic contribution to the combined signal may be removed or substantially removed. In particular, according to some embodiments, the thermo-optic contribution to the combined signal manifests itself as an added slowly-varying contribution to the Brillouin oscillations (due to the elasto-optic effect). That is, the Brillouin frequency is much higher than the frequency associated with the contribution of the thermo-optic effect to the combined signal. Thus, the thermo-optic contribution to the combined signal may be identified and removed, for example, by smoothing out the combined signal (that is, by averaging over short segments of the signal, such that each segment includes a small number of (Brillouin) oscillations). This may be especially pertinent when the target region is a silicon-based semiconductor, since in silicon-based semiconductors the thermo-optic effect may be much stronger than the elasto-optic effect.

According to some embodiments, computer simulations may be utilized to model the Brillouin oscillations, or even a single Brillouin oscillation, that would be observed if method 300 were implemented with respect to an ideal (i.e. perfectly manufactured) sample. (It is noted that when the longitudinal extent of a target region is comparable to the Brillouin wavelength, as may be the case, for example, in the depth-profiling of fin field-effect transistors, only a single Brillouin oscillation may be observed). The freedom in selecting the physical parameters characterizing the setup, allows canceling "by hand" the contribution of the thermo-optic effect, so that the signal processing operations to distinguish the Brillouin oscillations from the thermo-optic contribution are obviated. Further, according to some embodiments, computer simulations may also be used to model various types of imperfections in the sample and the system, and the Brillouin oscillations associated therewith.

In addition, samples that have undergone depth-profiling may be scanned using a scanning electron microscope (SEM) to obtain the actual (or true) structures of the target regions. More specifically, a target region of a sample that has gone depth-profiling (using the methods of present disclosure) may be cut into sufficiently thin layers and each layer may be scanned by a (SEM) to obtain the actual structure thereof. The obtained Brillouin oscillations (and more generally the plurality of measured signals) of different samples may thus be related to the actual structures of the respective target regions thereof.

Using machine learning tools, a measurement data analysis module, such as measurement data analysis module 208, may be taught to extract from observed Brillouin oscillations the depth-dependence of one or more parameters characterizing a probed lateral structural feature. The teaching may be supervised, employing pairs of observed Brillouin oscillations and/or simulated Brillouin oscillations with the corresponding structure of the lateral structural feature as measured (e.g. using a SEM) or simulated, respectively. Such Brillouin oscillations-lateral structural feature pairs, or similar types of pairs pertaining to similar setups, may potentially also be obtainable from existing libraries (e.g. online databases) of measured and/or simulated signals in similar setups (i.e. similar samples and systems).

In a uniform medium the Brillouin frequency $f_B$ is given by $f_B=(2 \cdot v_{sound} \cdot n)/\lambda_{probe}$. Here n is the refractive index and $\lambda_{probe}$ is the wavelength of the probe pulse. In a non-uniform medium, according to some embodiments, the Brillouin frequency may be determined by both the material composition and the geometry of the structure. Namely, according to some embodiments, the speed of sound $v_{sound}$ and the refractive index n are replaced by an "effective speed of sound", $v_{eff}(s)$, and an "effective refractive index", $n_{eff}(s)$, which in general may both be dependent on the depth s. The Brillouin frequency, $f_B(s)=(2 \cdot v_{eff}(s) \cdot n_{eff}(s))/\lambda_{probe}$, is therefore also generally dependent on the depth s. The extracted signal may therefore take on the form $O_B(s)=A(s) \cdot \sin(2\pi \cdot f_B(s) \cdot s + \phi_1)$. Hence, by obtaining $f_B(s)$ from the extracted signal $O_B(s)$, $v_{eff}(s)$ and $n_{eff}(s)$ may be estimated. $v_{eff}(s)$ and $n_{eff}(s)$ may, in turn, be correlated to one or more parameters characterizing the lateral structural feature that is sought to be depth-profiled. According to some embodiments, $f_B(s)$ may be directly related to a lateral structural feature (for example, to the average diameter of holes in an array of vertical holes, as described below in the description of FIGS. 9A-9E).

According to some embodiments, regression analysis may be employed to extract from the plurality of measured signals the depth-dependence of one or more lateral structural features.

According to some embodiments, operation 320 may be performed a plurality of times with respect to different preparations of the pump pulse and/or the probe pulse. Different preparations may differ from one in another in one or more of: a wavelength, power, waveform, and/or a polarization of the pump pulse, and/or a wavelength, power, waveform, and/or a polarization of the probe pulse. Per each preparation a plurality of measured signals, which after pre-processing (e.g. demodulation using a lock-in amplifier, smoothing out thermo-optic contributions to the measured signals) may be jointly analyzed to determine the depth-dependence of the at least one parameter characterizing the lateral structural feature.

According to some embodiments, wherein the sample is a wafer, operation 320 may be repeated with respect to different locations on the wafer. The pluralities of measured signals may be analyzed to obtain information about process-variations across the wafer.

According to some such embodiments, the same location(s) on different dies (die-to-die variation) may be probed and the obtained pluralities of measured signals may then be analyzed to obtain a large-scale map of process variations across the wafer.

According to embodiments, different locations on the same die—known to be characterized by the same lateral structural features up fabrication imperfections—may be probed and the obtained pluralities of measured signals may then be analyzed to obtain a map of process variations across a die (in-die variation) or one or more regions thereof, as described above in the description of FIG. 2.

Each of FIGS. 4 and 5 schematically depicts additional possible configurations (spatial arrangements) of a target region and an absorption layer within a sample, according to some embodiments. Referring to FIG. 4, a sample 400 (e.g. a semiconductor device) undergoing depth-profiling, according to some embodiments, is schematically depicted. Unlike absorption layer 120 (of sample 100 of FIGS. 1A-1C), which is included in target region 110, an absorption layer 420 of sample 400 is not included in a target region 410 of sample 400.

While FIG. 4 presents a two-dimensional view of target region 410 taken along the zx-plane, to facilitate the description, up to fabrication imperfections, target region 410 is assumed to exhibit rotational symmetry along an axis parallel to the z-axis (so that target region 410 is cylindrical). Hence, FIG. 4 effectively fully depicts target region 410.

More specifically, sample 400 includes target region 410, an outer region 430, and an inner region 440. Target region 410 is positioned between outer region 430 and inner region 440. Absorption layer 420 is positioned within inner region 440, adjacently to target region 410. Dashed lines $B_4$ indicate a circumferential boundary of target region 410.

To render the discussion more concrete and thereby facilitate the description, target region 410 is depicted as including two subregions: a target outer subregion 410a and a target inner subregion 410b, which is surrounded by target outer subregion 410a. Target inner subregion 410b may correspond to a first medium, characterized by a first refractive index, while target outer subregion 410a may correspond to a second medium, characterized by a second refractive, which differs from the first refractive index.

In FIG. 4, a width $w_4(z)$ of target inner subregion 410b is seen to increase in jumps (i.e. discontinuously) in the direction of the negative z-axis. The rotational symmetry of target region 410 implies that target inner subregion 410b is shaped as a circular step pyramid. Hence, $w_4(z)$ corresponds to the (depth-dependent) diameter of target inner subregion 410b. The lateral structural feature is constituted by the change from the first medium to the second medium exhibited along any radial direction perpendicular to a rotational symmetry axis $A_4$ of target region 410 (axis $A_4$ is parallel to the z-axis) when starting from axis $A_4$. A lateral extent, as defined above, of the lateral structural feature may be given by $\max_z[w_4(z)]$.

Also depicted is a pump pulse 423, which is projected on an external surface 424 of outer region 430 (and sample 400). Pump pulse 423 is configured to penetrate into sample 400 and to reach absorption layer 420 by propagating through outer region 430 and target region 410. In particular, outer region 430 and target region 410 may be transparent, or substantially transparent, to pump pulse 423. Pump pulse 423 is further configured to be absorbed in absorption layer 420 and thereby heat and expand absorption layer 420. The expansion of absorption layer 420 produces an acoustic pulse 425, which propagates in the direction of the negative z-axis into target region 410. A second acoustic pulse (not shown) may propagate in the direction of the positive z-axis inside inner region 440.

Also depicted is a probe pulse 427, which is projected on sample 400 at a controllable time-delay with respect to pump pulse 423. (Thus, FIG. 4 should be understood as a schematic and not as representing a single instance of time.) Probe pulse 427 is configured to penetrate into sample 400 and propagate therein, such as to be scattered off acoustic pulse 425 at a controllable depth within target region 410.

Further indicated is a scattered component 431 of probe pulse 427, which is (Brillouin) scattered backwards off acoustic pulse 425. Scattered component 431 may be detected by a detector 432 to produce a corresponding measured signal.

Referring to FIG. 5, a sample 500 undergoing depth-profiling, according to some embodiments, is schematically depicted. Unlike target region 110 (of sample 100 of FIGS. 1A-1C), which is positioned adjacently to external surface 124 of sample 100, a target region 510 of sample 500 is fully embedded within sample 500 (and, hence, is not positioned adjacently to an external surface 524 of sample 500).

While FIG. 5 presents a two-dimensional view of target region 510 taken along the zx-plane, to facilitate the description, target region 510 is assumed to be uniform along the y-axis up to fabrication imperfections. Hence, FIG. 5 effectively fully depicts target region 510.

More specifically, sample 500 includes target region 510, an outer region 530, and an inner region 540. Target region 510 is positioned between outer region 530 and inner region 540. An absorption layer 520 is positioned within target region 510, adjacently to outer region 530. A dashed line $B_5$ indicates a first boundary of target region 510 and a dashed line $B_5'$ indicates a second boundary of target region 510. To render the discussion more concrete and thereby facilitate the description, target region 510 is depicted as including three adjacent subregions: a first side-subregion 510a, a second side-subregion 510b, and a mid-subregion 510c, which is positioned between first side-subregion 510a and second side-subregion 510b. A width $w_5(z)$ of mid-subregion 510c increases in the direction of the positive z-axis.

Also depicted is a pump pulse 523, which is projected on an external surface 524 of outer region 530 (and sample 500). Pump pulse 523 is configured to penetrate into sample 500 and to reach absorption layer 520 by propagating through outer region 530. In particular, outer region 530 may be transparent, or substantially transparent, to pump pulse 523. Pump pulse 523 is further configured to be absorbed in absorption layer 520 and thereby heat and expand absorption layer 520. The expansion of absorption layer 520 produces an acoustic pulse 525, which propagates in the direction of the positive z-axis into target region 510. A second acoustic pulse (not shown) may propagate in the direction of the negative z-axis inside outer region 530.

Also depicted is a probe pulse 527, which is projected on sample 500 at a controllable time-delay with respect to pump pulse 523. (Thus, FIG. 5 should be understood as a schematic and not as representing a single instance of time.) Probe pulse 527 is configured to penetrate into sample 500 and propagate therein, such as to be scattered off acoustic pulse 525 at a controllable depth within target region 510. Probe pulse 527 may further be configured to undergo comparatively little scattering off the second acoustic pulse propagating within outer region 530 (i.e. the total cross-section for (backward) scattering off the second acoustic pulse may be significantly smaller than the total cross-section for (backward) scattering off acoustic pulse 525). For example, the waveform of probe pulse 527 may be selected such that probe pulse 527 is focused within target region 510 but defocused within outer region 530.

Further indicated is a scattered component 531 of probe pulse 527, which is (Brillouin) scattered backwards off acoustic pulse 525. Scattered component 531 may be detected by a detector 532 to produce a corresponding measured signal.

Figures 6C, 6D:
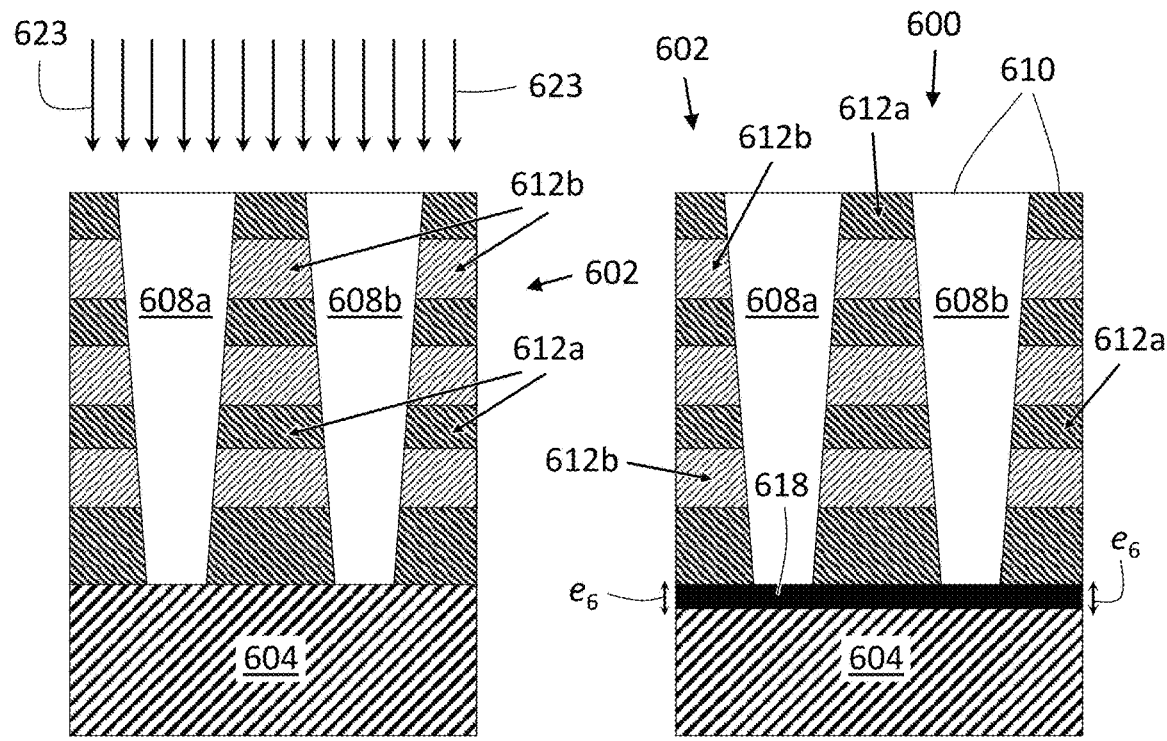
FIGS. 6C-6F schematically depict four stages, respectively, in a depth-profiling of the sample of FIG. 6A, according to some embodiments.

FIGS. 6A-6F schematically depict a sample 600 undergoing depth-profiling, according to some embodiments. Referring to FIG. 6A, sample 600 is depicted with a front part thereof removed to better reveal the internal structure thereof. Sample 600 includes a structure 602 positioned on a bulk 604. Structure 602 includes (air) holes 608 projecting thereinto. According to some embodiments, holes 608 may project into structure 602 from a top (as depicted in the figure) external surface 610 thereof. Structure 602 may be characterized by a first (effective) refractive index and bulk 604 may be characterized by a second refractive index, which differs from the first refractive index.

Due to the presence of holes 608, structure 602 includes a plurality of lateral structural features, which constitute a composite lateral structural feature. According to some embodiments, and as depicted in FIG. 6A, the composite lateral structural feature forms a repeating pattern. That is, holes 608 are arranged in a periodic two-dimensional array. According to some such embodiments, the two-dimensional array is rectangular with holes 608 being arranged in rows and columns parallel to x-axis and y-axis, respectively.

More specifically, with each of holes 608 a lateral structural feature is associated, which is constituted by the change from air to solid exhibited along any radial direction perpendicular to a longitudinal axis of the hole when starting from the longitudinal axis. (The longitudinal axis extends in parallel to the z-axis.) Two longitudinal axes Aa and Ab of hole 608a and 608b, respectively, are indicated in FIG. 6B.

To facilitate the description, in the following, each of holes 608 is assumed to project longitudinally into structure 602 and to be characterized by an elliptical lateral cross-section whose area decreases with the depth. That is, each of holes 608 may be characterized by (conjugate) diameters $d_x(s)$ and $d_y(s)$ quantifying the width of holes 608 along the x-axis and the y-axis, respectively. Two such diameters, $d_x'(s)$ and $d_x''(s)$ of holes 608a and 608b are indicated in FIG. 6A at s=0, i.e. on top external surface 610. Here s is the depth within sample 600. (Generally, s=z+k, wherein k is a constant. If the coordinate system is selected such that the xy-plane coincides with top external surface 610, then k=0 and s=z.) Also indicated in FIG. 6B are diameters $d_x^{(a)}(s)$ and $d_x^{(b)}(s)$ of holes 608a and 608b at depths s=s' and s=s'', respectively.

To "lowest order" the depth-dependence of the lateral structural features may be parametrized by the depth-dependence the of lateral cross-sectional areas (of the holes). If more accuracy is required, the depth-dependence of two parameters may be estimated, that is, the two conjugate diameters of an ellipse, as elaborated on below. If still more accuracy is required, in principle, the depth-dependence of additional parameters parameterizing various deformations—which are potentially depth-dependent—may also be sought to be obtained. For example, parameters characterizing tilting of the symmetry axes of the holes (which may depend on the depth), deviation in the spacing between adjacent holes (from design specified spacings), and so on.

According to some embodiments, in order to obtain the depth-dependencies of a plurality of parameters characterizing a lateral structural feature, operation 320 may be implemented with respect to different preparations of the pump pulse and/or the probe pulse. For example, operation 320 may be performed one or more times with the probe pulse polarized in parallel to the x-axis, and one or more times with the probe pulse polarized in parallel to the y-axis. In this way, the average depth-dependencies of each of the two conjugate diameters characterizing the elliptical cross-sections of holes 608 may be obtained.

FIG. 6B presents a (partial) cross-sectional view of sample 600, according to some embodiments. The cross-section cuts sample 600 along a plane, which is parallel to the zx-plane. According to some embodiments, and as depicted in FIGS. 6B-6F, structure 602 may be a layered structure including a plurality of layers 612 stacked (i.e. positioned) on top of one another. (Layers 612 are not shown in FIG. 6A.) According to some embodiments, layers 612 may include two types of layers: layers 612a and layers 612b, alternately positioned one on top of the other. Layers 612a and layers 612b may be made of different materials. According to some embodiments, sample 600 may be a V-NAND (i.e. vertical-NAND) stack, wherein structure 602 is mounted on a silicon substrate constituted by bulk 604. As a non-limiting example, according to some such embodiments, layers 612a (including the outermost layer) may be made of silicon oxide ($SiO_2$) and layers 612b may be made of a silicon nitride (e.g. $Si_3N_4$).

FIGS. 6C-6F schematically depict four successive stages, respectively, in depth-profiling of a target region 624 (shown in FIG. 6A and delineated by a dashed-double-dotted line), according to method 300. Referring to FIG. 6C, a pump pulse 623 is shown projected on top external surface 610, according to some embodiments. Pump pulse 623 is configured to penetrate into structure 602 and propagate therein to reach bulk 604. Pump pulse 623 is further configured to be absorbed by bulk 604. Pump pulse 623 is also indicated in FIG. 6A.

Referring to FIG. 6D, pump pulse 623 is absorbed in an absorption layer 618 (which forms part of bulk 604) positioned adjacently to structure 602. A thickness of absorption layer 618 is determined by the absorption length of pump pulse 623 in bulk 604. The heating of absorption layer 618 leads to an expansion thereof, as indicated by double-headed arrows $e_6$ in FIG. 6B.

Figures 6E, 6F:
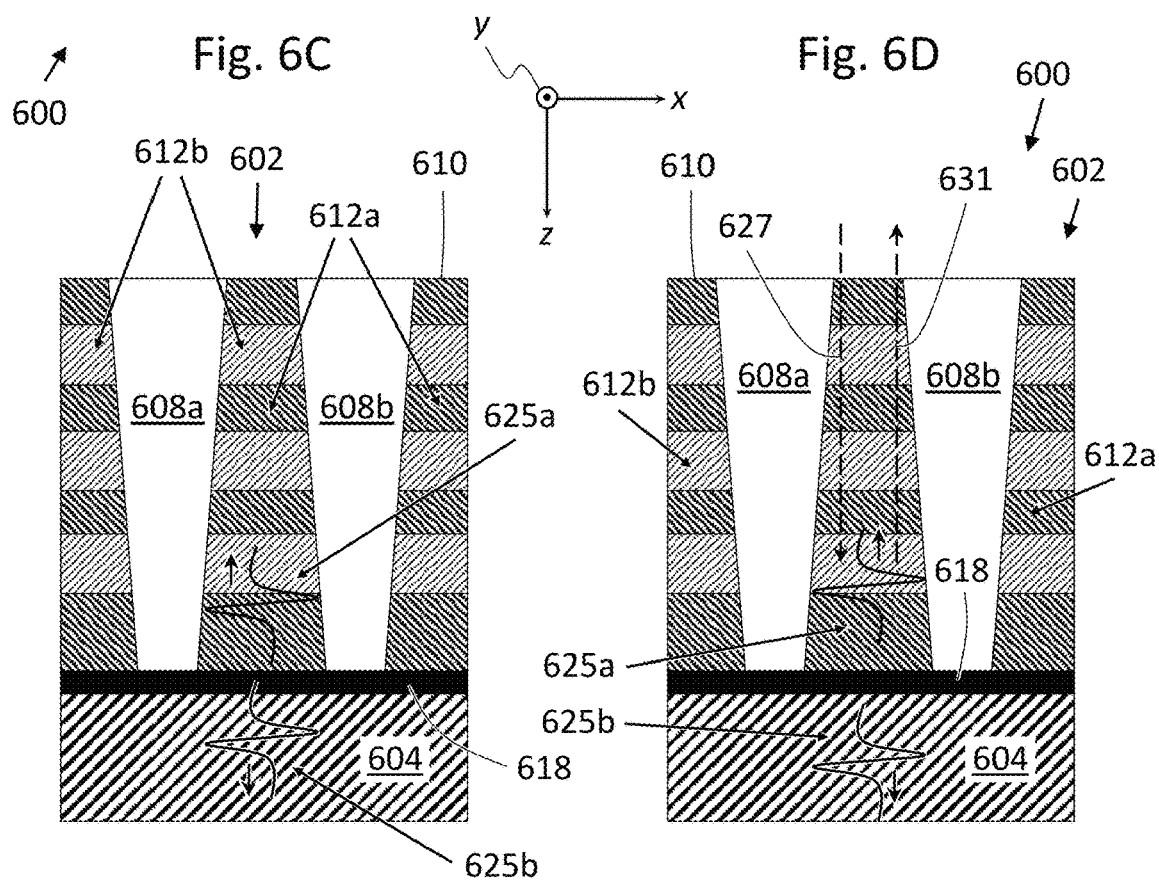

Referring to FIG. 6E, the expansion of absorption layer 618 leads to the formation of a (first) acoustic pulse 625a propagating within structure 602 in the direction of the negative z-axis. A second acoustic pulse 625b may propagate within bulk 604 in the direction of the positive z-axis.

Referring to FIG. 6F, a probe pulse 627 is shown projected on top external surface 610, according to some embodiments. Probe pulse 627 is configured to penetrate into structure 602 and propagate therein in the direction of the positive z-axis. That is, probe pulse 627 is configured such that structure 602—at least when undisturbed—is transparent, or at least semi-transparent, with respect to probe pulse 627. The localized presence of acoustic pulse 625a in a subregion within structure 602, renders that subregion non-transparent to probe pulse 627. More precisely, probe pulse 627 is further configured to undergo Brillouin scattering off acoustic pulse 625a. A (back) scattered component 631 of probe pulse 627 propagates away from acoustic pulse 625a in the direction of the negative z-axis.

Referring again to FIG. 6A, target region 624 is included in structure 602. Target region 624 is shaped as a cylinder, whose diameter is defined by a beam diameter of pump pulse 623. According to some embodiments, in order to fully probe target region 624, a beam diameter of probe pulse 627 may be selected to equal, or substantially equal, the diameter of pump pulse 623. Target region 624 thus constitutes the part of structure 602, which undergoes the depth-profiling.

It is noted that target region 624 includes a plurality of holes from holes 608, and, in particular, a plurality of the lateral structural feature. Since the holes in target region 624 are depth-profiled together, the plurality of measured signals obtained when subjecting target region 624 to a depth-profiling according to method 300, collectively characterize the depth-dependence of the plurality of the lateral structural feature (included in target region 624). That is, the obtained plurality of measured signals characterizes an average depth-dependence of the parameters characterizing the lateral structural features. In particular, from the plurality of measured signals an average depth-dependence of the lateral cross-sectional area of the holes, or the two conjugate diameters characterizing the lateral cross-section of the hole, may be obtained. Put another way, the beam diameter of probe pulse 627 (which is assumed to equal that of pump pulse 623) defines a target region (i.e. target region 624) including a plurality of holes and therefore a plurality of lateral structural features, which together define a composite lateral structural feature. The lateral extent of the composite lateral structural feature is equal to the beam diameter of probe pulse 627.

According to some embodiments, wherein holes 608 are arranged in a two-dimensional array, probe pulse 627 may be linearly polarized along a direction perpendicular to the z-axis. More specifically, according to some embodiments, wherein holes 608 are arranged in a rectangular array as described above, in order to increase measurement sensitivity along the y-axis, probe pulse 627 may be polarized in parallel to the x-axis. Similarly, in order to increase measurement sensitivity along the x-axis, probe pulse 627 may be polarized in parallel to the y-axis. As shown below in the Results of Simulations subsection, polarizing the probe pulse in parallel the x-axis leads to a non-uniform intensity distribution of the probe pulse within the target region, wherein the intensity is maximum along columns of holes. In contrast, polarizing the probe pulse in parallel they-axis leads to a non-uniform intensity distribution of the probe pulse within the target region, wherein the intensity is maximum along rows of holes.

Figure 6G:
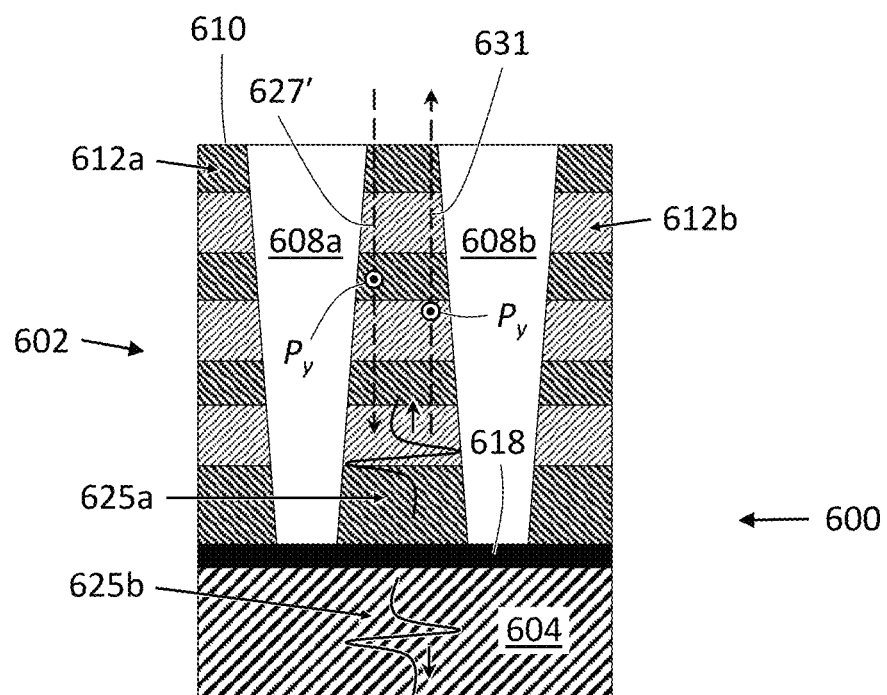
FIG. 6G schematically depicts a stage in a depth-profiling of the sample of FIG. 6A, according to some alternative embodiments to those of FIGS. 6C-6F.

FIG. 6G depicts depth-profiling of target region 624, according to some embodiments. The depicted depth-profiling constitutes a specific embodiment of the depth profiling depicted in FIGS. 6A-6F. A probe pulse 627' is depicted, which is a specific embodiment of probe pulse 627. Probe pulse 627' is polarized along the y-axis, as indicated by a polarization arrow $P_y$. This allows increasing the measurement sensitivity along the x-axis, so that variations in the average depth-dependence of the x-widths of the holes (i.e. the function $d_x(s)$ averaged over the holes) may be obtained to greater precision. (Thus, for example, if only holes 608a and 608b are probed, then the obtained depth-dependence constitutes an average over the x-widths of holes 608a and 608b).

Also indicated in FIG. 6G are a (first) acoustic pulse 625a', a second acoustic pulse 625b', and a scattered component 631', which are specific embodiments of acoustic pulse 625a, second acoustic pulse 625b, and scattered component 631. Scattered component 631' is also polarized in along they-axis.

While in FIGS. 6A-6G the diameter(s) of holes 608 is depicted as decreasing linearly with the depth, the skilled person that the methods and systems of the present disclosure may be applied to probe other hole geometries, such as, for example, circular hole geometries wherein the change (with the increase in depth) of the hole diameter is non-monotonic (e.g. increasing first and then decreasing).

FIGS. 7A-7E schematically depict a sample 700 undergoing depth-profiling, according to some embodiments. Sample 700 includes a base portion 704 and a plurality of fins 708 positioned on base portion 704. Each of fins 708 forms an elongated ridge-like structure, which projects from base portion 704. According to some embodiments, and as depicted in FIGS. 7A-7E, fins 708 are of the same shape and are arranged in parallel to one another.

Sample 700 includes a plurality of lateral structural features, which form a composite lateral structural feature. According to some embodiments and as depicted in FIGS. 7A-7E—the composite lateral structural feature forms a repeating pattern (i.e. periodically repeating in the direction of the x-axis). For each of fins 708, the associated lateral structural feature is constituted by the change from air to fin and back to air as the fin is traversed in a lateral direction perpendicular to the elongate dimension (i.e. in parallel to the x-axis).

To facilitate the description and render the discussion more concrete, in FIGS. 7A-7E a width $w_7(z)$ of fins 708 is depicted as decreasing with the distance from base portion 704. (The skilled person will understand, however, that other geometries are possible.) $w_7(z)$ constitutes a parameter characterizing a depth-dependence of the lateral structural feature in the sense defined herein above. If more accuracy is required, in principle, the depth-dependence of additional parameters may be sought to be obtained, for example, parameters characterizing deviations from design specifications (due to fabrication imperfections) of the slopes of a right wall and a left wall of the fin. A lateral extent $C_7$ of the fins may correspond to the maximum width of the fins, which in FIGS. 7A-7E corresponds to the width of a fin at the base thereof adjacently to base portion 704. That is, $C_7=\max_z[w_7(z)]$ According to some embodiments, and as depicted in FIGS. 7A-7E, the plurality of fins 708 constitutes a target region 710, which is depth-profiled. According to some such embodiments, sample 700 may be a fin field-effect-transistor (FinFET). In such embodiments, sample 700 may be made of silicon, silicon-germanium, or other suitable semiconductor materials.

FIGS. 7B-7E present cross-sectional views of sample 700 depicting four successive stages, respectively, in a depth-profiling of sample 700, according to method 300. The cross-section cuts sample 700 along a plane, which is parallel to the zx-plane. Referring to FIG. 7B, a pump pulse 723 is shown projected on sample 700 (on the side of sample 700 on which fins 708 are positioned), according to some embodiments.

Referring also to FIG. 7C, pump pulse 723 is configured to be absorbed in fins 708. More specifically, pump pulse 723 is configured to be absorbed in (lateral) absorption layers 712. Each of absorption layers 712 constitutes a top strip of a respective fin from fins 708. For example, an absorption layer 712a from absorption layers 712 constitutes a top strip of a fin 708a from fins 708. A thickness of absorption layers 712 may be determined by (or primarily by) the absorption length of pump pulse 723 within the fins. The absorption length in turn is dependent at least on the wavelength (and polarization angle) of pump pulse 723. The heating of absorption layers 712 leads to expansion thereof, as indicated by double-headed arrows $e_7$ in FIG. 7C.

Referring to FIG. 7D, the expansion of absorption layers 712 leads to the formation of acoustic pulses 725, respectively. Each of acoustic pulses 725 propagates within a respective fin (from fins 708) away from the absorption layer towards base portion 704. For example, an acoustic pulse 725a (from acoustic pulses 725) propagates within fin 708a in the direction of the negative z-axis.

Referring to FIG. 7E, a probe pulse 727 is shown projected on sample 700 (on the side of sample 700 from which fins 708 project), according to some embodiments. Probe pulse 727 is configured to penetrate into fins 708 and propagate therein in the direction of the positive z-axis. That is, probe pulse 727 is configured such that fins 708—at least when undisturbed—are transparent, or at least semi-transparent, with respect to probe pulse 727. The localized presence of acoustic pulses 725, in respective subregions within fins 708, renders these subregions non-transparent to probe pulse 727. More precisely, probe pulse 727 is further configured to undergo Brillouin scattering off acoustic pulses 725. A (back) scattered component 731 of probe pulse 727 propagates away from acoustic pulses 725 in the direction of the negative z-axis.

It is noted that for the above-described configurations of pump pulse 723 and probe pulse 727 fins 708 are probed simultaneously. Thus, when subjecting target region 710 to a depth-profiling according to method 300, with the above-described configurations of pump pulse 723 and probe pulse 727, the obtained plurality of measured signals collectively characterizes the depth-dependence of the lateral structural features included in target region 710 (in the sense described above in the description of FIGS. 6A-6G). With reference to sample 700, from such a plurality of measured signals at least an average depth-dependence of the widths of fins 708 may be extracted.

According to some embodiments pump pulse 723 and/or probe pulse 727 may be (linearly) polarized along the elongate dimension of fins 708 (i.e. along the y-axis), thereby increasing the measurement efficacy. The above choice of polarization for pump pulse 723 increases the absorption thereof in absorption layers 710 and minimizes absorption of thereof in sidewalls 716 (also numbered in FIG. 7A) of fins 708. Further, as shown below in the Results of Simulations subsection, the above choice of polarization for probe pulse 727 maximizes the penetration of probe pulse 727 into fins 708. In contrast, if probe pulse 727 is polarized perpendicularly to the elongate dimensions of fins 708 (i.e. along the x-axis), fins 708 are substantially transparent to thereto. That is, in the latter case, substantially all the radiation is concentrated outside fins 708 in the spaces there between.

Figure 7A:
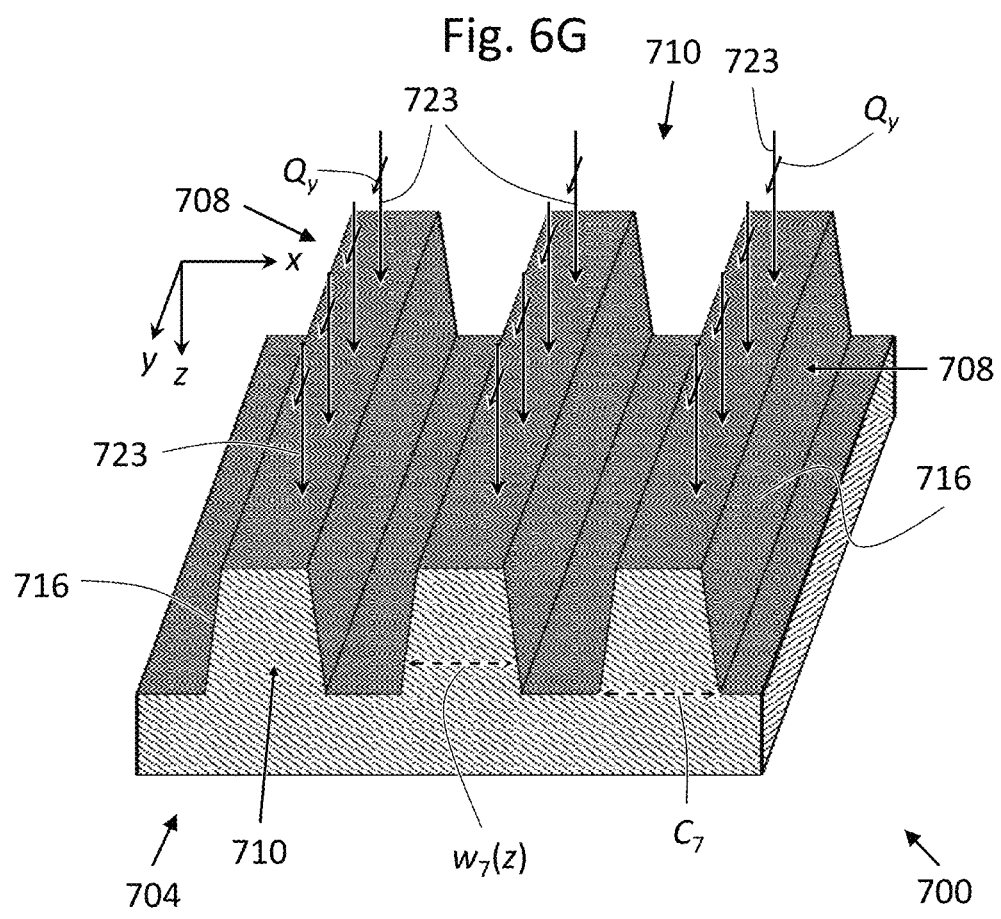
FIG. 7A presents a schematic perspective view of a sample, which according to some embodiments corresponds to a fin field-effect-transistor (FinFET), and which may be depth-profiled using the methods and systems of the present disclosure, according to some embodiments thereof.

The polarization direction of pump pulse 723 is indicated in FIGS. 7A and 7B by polarization arrows $Q_y$. The polarization direction of probe pulse 727 is indicated in FIG. 7E by polarization arrows $Q_y'$, which is also the polarization direction of scattered component 731.

Results of Simulations

FIG. 8 depicts an extracted signal obtained through a computer simulation of an implementation of method 300 with respect to a V-NAND stack, according to some embodiments. The V-NAND stack is characterized by a hole-profile similar to that of holes 608 of sample 600 (depicted in FIGS. 6A-6H). More specifically, plotted is a (normalized) extracted signal E obtained in the scattering of a series of probe pulses off acoustic pulses at different depths, respectively, within the sample. E=ΔI/I, wherein I represents the intensity of the measured signal and ΔI the deviation (resulting from the Brillouin scattering) from a baseline of the measured signal. The acoustic pulses are generated by identically prepared pump pulses, as described above in the description of FIGS. 6A-6H. The horizonal axis measures the time t from the generation of an acoustic pulse, so that the greater t the smaller the scattering depth. The maximum scattering depth corresponds to t=0 (at which time the acoustic pulse penetrates e.g. from absorption layer 618 into structure 602). The end of the time scale represents the time at which the acoustic pulse reaches the external surface of the sample on which the probe pulse is incident (e.g. top external surface 610). A plurality of Brillouin oscillations is observed with the amplitude of the oscillations decreasing with t, that is, increasing with depth.

Using frequency estimation techniques, such as short-time Fourier transform or sine-fitting over short time-intervals, the time dependence of the Brillouin frequency may be obtained from the extracted signal. This, in turn, allows obtaining the local Brillouin frequency, i.e. the Brillouin frequency as a function of the depth s. It is noted that when the speed of sound is constant throughout the target region, the relation between the time t and the depth s is linear.

FIGS. 9A-9E present results of computer simulations of depth-profiling of five samples, respectively, using method 300, according to some embodiments. The five samples are depicted in FIGS. 10A-10E, respectively. Each of the five samples includes an array of identical vertically extending holes. The samples differ from one another in the profile (i.e. shape) of the holes. Each of the five samples modeled resembles sample 600 (up to a different hole-profile), and, as such, may correspond to a possible design of a V-NAND stack, or to specific possible distortions—due to manufacturing imperfections—on such a design. For example, the hole profile of FIG. 10A, may represent a possible specific design of a V-NAND stack while FIG. 10E may represent a possible specific distortion thereof. Or, for example, the hole profile of FIG. 10B, may represent a possible specific design of a V-NAND stack while FIG. 10D may represent a possible specific distortion thereof. The vertical axis parameterizes the depth s as measured from the top of a hole. The horizontal axis x parameterizes the width of the hole. Only one half of a hole is shown in each of FIGS. 9A-9E with the implicit understanding that the hole exhibits rotational symmetry about the vertical axis (as depicted in FIGS. 10A-10E).

Referring to FIG. 10A, a cross-sectional view of a sample 1000a is shown. A diameter of holes 1008a within sample 1000a is constant (i.e. does not change with the depth). Referring to FIG. 10B, a cross-sectional view of a sample 1000b is shown. A diameter of holes 1008b within sample 1000b decreases with the depth at a constant rate. Referring to FIG. 10C, a cross-sectional view of a sample 1000c is shown. A diameter of holes 1008c within sample 1000c decreases with the depth at a first rate for depths smaller than a threshold depth (not indicated) and at a second rate for depths greater than the first depth. The first rate is greater than the second rate. Referring to FIG. 10D, a cross-sectional view of a sample 1000d is shown. A diameter of holes 1008d within sample 1000d decreases with the depth at a first rate for depths smaller than a threshold depth (not indicated) and at a second rate for depths greater than the first depth. The first rate is smaller than the second rate. Referring to FIG. 10E, a cross-sectional view of a sample 1000e is shown. A diameter of holes 1008e within sample 1000e increases at a first rate with the depth for depths smaller than a first threshold depth (not indicated), decreases at a second rate for depths greater than the first threshold depth and smaller than a second threshold depth, and decreases at a third rate for depths greater than the second threshold depth. The second rate is smaller than the third rate.

In each of FIGS. 9A-9E, the (true) hole-profile is depicted by a double-lined curve, while the estimated hole-profile, as derived from the (simulated) measured signals, is depicted by a dotted-curve. The estimated hole-profile corresponds to an estimate of the average hole-profile (taken over all the holes in the array). However, since in the simulation the holes were all taken to be identical, this distinction is irrelevant, except that by simultaneously probing all the holes in the array, rather than a single hole, boundary (i.e. edge) effects are reduced and a better estimate is obtained.

The simulations indicate that the speed of sound within each of the samples is practically independent of the depth s, and, moreover, is practically independent of the hole-profile. That is, the simulations indicate that the speed of sound is essentially dependent only on the material composition of the samples (which is the same for all the samples). The local Brillouin frequency $f_B(s)$ is practically fully determined by $n_{eff}(s)$.

The local Brillouin frequency can be shown to be correlated to the hole-diameter in a roughly linear manner. That is, $f_B^{(i)}(s) \sim a_i + b_i \cdot d_i(s)$, wherein the index i=1, 2, ..., 5 labels the sample, $d_i(s)$ is the hole-diameter (of sample i) at depth s, and $a_i$ and $b_i$ (which is positive) are constants. More specifically, a linear fitting algorithm was employed to fit the $f_B^{(i)}(s)$ about the respective true hole-profiles. In a real-life (i.e. non-simulation) implementation of method 300, the obtained local Brillouin frequency may be linearly fitted about the expected hole-profile.

FIGS. 11A-11C present results of computer simulations of depth-profiling of three samples, respectively, using method 300, according to some embodiments. The samples of FIGS.

11A, 11B, and 11C correspond those of FIGS. 9A, 9B, and 9D, respectively. The clearly noticeable differences in the estimated profiles there between are due to the use of different data analysis and fitting schemes, as detailed below.

More specifically, to obtain the estimated profiles of FIGS. 11A-11C, each of the extracted signals was smoothed to identify the thermo-optic contribution thereto. The thermo-optic contribution was next subtracted from the respective (unsmoothed) extracted signal, and the respective dependence of the Brillouin frequency on the depth s was obtained. The resulting local Brillouin frequencies were next fitted about the respective true hole-profiles using a third order polynomial fitting algorithm. In a real-life implementation of method 300, the obtained local Brillouin frequency may be fitted about the expected hole-profile.

The different data analysis and fitting schemes employed to obtain the hole-profiles of FIGS. 9A-9E and FIGS. 11A-11C, respectively, yield results which are roughly of similar quality, but which nevertheless noticeably differ. While the estimated hole-profiles of FIGS. 9A-9E are "noisy", the estimated hole-profiles of FIGS. 11A-11C are smooth but, in contrast, exhibit "systemic" errors in the sense of overestimation or underestimation of the diameter over extended depth-ranges. This suggests that better estimates may be obtainable. In particular, use of machine learning tools or deep learning tools is expected to yield better estimates.

Figures 12A, 12B:
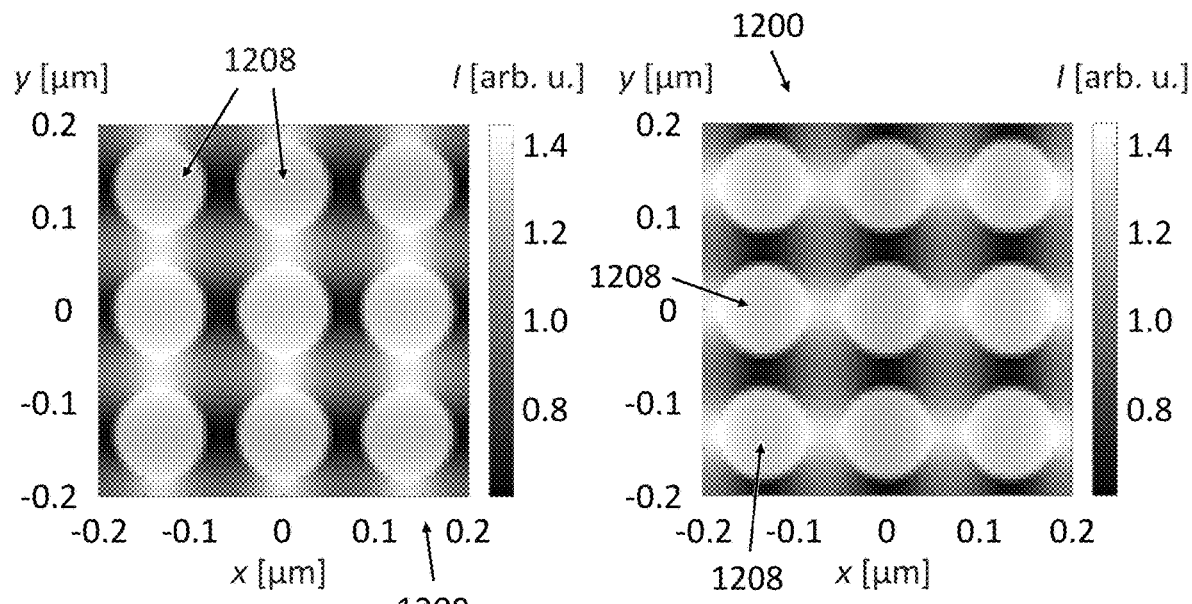
FIGS. 12A and 12B present results of simulations of two implementations of the method of FIG. 3 with respect to the sample of FIG. 8, respectively, according to some embodiments; shown are lateral distributions of intensities of the probe pulses; the two simulations differ in the polarizations of the probe pulses.

Referring to FIGS. 12A and 12B, FIG. 12A shows the penetration of a simulated x-polarized probe pulse into a simulated V-NAND stack 1200. More specifically, a lateral cross-sectional view of V-NAND stack 1200, including holes 1208, is shown. V-NAND stack 1200 is a specific embodiment of sample 600. Also shown is an intensity scale I (in arbitrary units) ranging from dark to light. The bottom end of the scale corresponds to minimum intensity and the top end of the scale corresponds to maximum intensity, which is registered inside the holes. Within the bulk of V-NAND stack 1200 the intensity distribution of the probe pulse is seen to be maximum along columns (which extend in parallel to the y-axis) of holes 1208. That is, the x-polarized probe pulse penetrates into the bulk of the V-NAND stack between adjacent pairs of holes along the columns, and substantially does not penetrate between adjacent pairs of holes along rows (which extend in parallel to the x-axis) of holes 1208. FIG. 12B shows the penetration of a simulated y-polarized probe pulse into V-NAND stack 1208. Within the bulk of V-NAND stack 1200 the intensity distribution of the probe pulse is seen to be maximum along the rows. That is, the y-polarized probe pulse penetrates into the bulk of the V-NAND stack between adjacent pairs of holes along the rows, and substantially does not penetrate between adjacent pairs of holes along the columns.

Figure 13:
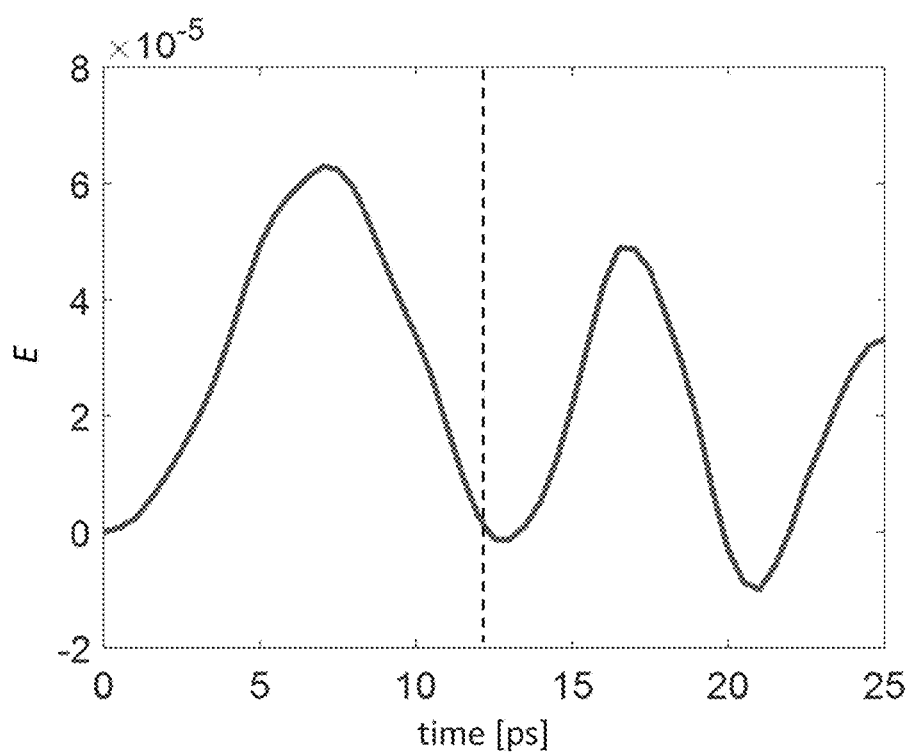
FIG. 13 presents results of simulations of an implementation of the method of FIG. 3 with respect to a sample including a plurality of parallel of fins, according to some embodiments; shown is an extracted (measured) signal obtained as a result of scattering probe pulses off acoustic pulses at a range of depths within the fins.

FIG. 13 depicts an extracted signal obtained through a computer simulation of an implementation of method 300 with respect to a FinFET, according to some embodiments. The FinFET is characterized by a fin-profile similar to that of fins 708 of sample 700 (depicted in FIGS. 7A-7E). More specifically, plotted is a (normalized) extracted signal E obtained in the scattering of a series of probe pulses off acoustic pulses at different depths, respectively, within the fins. ($E=\Delta I/I$, as explained above in the description of FIG. 8.) The acoustic pulses are generated by identically prepared pump pulses, as described above in the description of FIGS. 7A-7E. The horizontal axis measures the time t from the generation of an acoustic pulse, or, what amounts to the same thing, the scattering time. In particular, the greater t, the greater the scattering depth. At time t=0 the acoustic pulses start propagating into the fins from the absorption layers—that is, the top layers of the fins (e.g. absorption layers 712). The maximum scattering depth corresponds to $t=t_{base}$ (at which time the acoustic pulses reach the base portion of the FinFET, e.g. base portion 705). A single Brillouin oscillation is observed.

FIGS. 14A-14E present results of computer simulations of depth-profiling of five samples, respectively, using method 300, according to some embodiments. Each of the five samples includes a plurality of parallel and identical fins (e.g. fins 708) disposed on a base portion (e.g. base portion 704). The samples differ from one another in the lateral cross-sectional profiles of the fins. Each of the five samples modeled resembles sample 700, and, as such, may correspond to a possible design of a fin field-effect transistor (FinFET), or to specific possible distortions—due to manufacturing imperfections—on such a design. The vertical axis parameterizes the depth s as measured from the top of a fin. (The top layers of the fins constitute the absorption layers, as described above in the description of FIGS. 7A-7E.) The horizontal axis x parameterizes the width of the fin. Only one half of fin a is shown in each of FIGS. 14A-14E, with the implicit understanding that the fin exhibits mirror symmetry about the ys-plane (the y-axis points outside from the page). More specifically, the ys-plane bisects each fin into two identical longitudinal parts.

In each of the figures, the (true) fin-profile is depicted by a double-lined curve, while the estimated fin-profile, as derived from the (simulated) measured signals, is depicted by a dotted-curve. The estimated fin-profile corresponds to an estimate of the average fin-profile. However, since in the simulation the fins were all taken to be identical, this distinction is irrelevant, except that by simultaneously probing all the fins in the array, rather than a single fin, boundary effects are reduced and a better estimate is obtained.

A linear regression algorithm was employed to estimate, based on the extracted signals, the average fin-profile. More specifically, a temporal linear regression algorithm was used to relate the scattering time to the width of fin (at the depth s at which the scattering occurs). The scattering time t is straightforwardly related to the scattering depth s via $s=v_{sound} \cdot t$, thereby allowing to obtain the (estimated) dependence of the (average) width of the fins on the scattering depth s.

In each of the simulations both the pump pulse and the probe pulse were linearly polarized along the longitudinal dimension of the fins, i.e. in parallel to the y-axis. As explained in the description of FIG. 7E, this choice of pump pulse polarization minimizes the penetration of the pump pulses into the sidewalls of the fins, and thereby helps create a uniform acoustic pulse within each of the fins. Further, this choice of probe pulse polarization maximizes interaction of the probe pulses with the acoustic pulses, as can be seen in FIGS. 15A and 15B.

FIG. 15A shows the penetration of ay-polarized probe pulse into a plurality of parallel fins 1508. Fins 1508 project from a base portion 1504. Fins 1508 are specific embodiments of fins 708. Base portion 1504 is a specific embodiment of base portion 704. The vertical axis s parameterizes depth as measured from the top of a fin. The horizontal axis x extends perpendicularly to the elongate dimension of fins 1508. More precisely, FIG. 15A shows a cross-sectional view of fins 1508 and base portion 1504 with an intensity distribution of the probe pulse in greyscale superimposed thereon. Also shown is an intensity scale I (in arbitrary units) ranging from dark to light, which quantifies the intensity. The bottom end of the scale corresponds to minimum intensity and the top end of the scale corresponds to maximum intensity. The probe pulse is clearly seen to penetrate into fins 1508.

In contrast, FIG. 15B shows the comparative lack of penetration of a x-polarized probe pulse into the fins: The probe pulse essentially does not penetrate into the fins.

As used herein, the terms "lateral extension" and "maximal lateral extension", in reference to a lateral structural feature or a composite lateral structural feature, may be used interchangeably.

As used herein, according to some embodiments, the terms "depth profiling" and "3D probing" may be used interchangeably.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although operations in disclosed methods, according to some embodiments, may be described in a specific sequence, methods of the disclosure may include some or all of the described operations carried out in a different order. A method of the disclosure may include a few of the operations described or all of the operations described. No particular operation in a disclosed method is to be considered an essential operation of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A method for depth-profiling of semiconductor devices, the method comprising operations of:
    providing a semiconductor device comprising a target region, which comprises a lateral structural feature;
    obtaining a plurality of measured signals by implementing a plurality of times sub-operations of:
        projecting an optical pump pulse on the semiconductor device, such as to produce an acoustic pulse, which propagates within the target region of the semiconductor device, wherein a wavelength of the pump pulse is at least two times greater than a lateral extent of the lateral structural feature of the semiconductor device along at least one lateral direction;
        projecting an optical probe pulse on the semiconductor device, such that the probe pulse undergoes Brillouin scattering off the acoustic pulse within the target region; and
        detecting a scattered component of the probe pulse to obtain a measured signal;
    wherein in each implementation the respective probe pulse is scattered off the acoustic pulse at a respective depth within the target region, such that the target region is probed at a plurality of depths; and
    analyzing the plurality of measured signals to obtain a depth-dependence of at least one parameter characterizing the lateral structural feature.

2. The method of claim 1, wherein a direction of propagation of the acoustic pulse within the target region is parallel to a longitudinal dimension of the target region, which parameterizes depth within the semiconductor device, and wherein the probe pulses are configured such that an absorption length thereof in the target region is greater than an extent of the target region along the longitudinal dimension.

3. The method of claim 1, wherein the lateral structural feature is manifested as a change in a refractive index, and/or a change in a speed of sound, in the target region along at least one lateral direction.

4. The method of claim 3, wherein the change in the refractive index, and/or the change in the speed of sound, is due to one or more changes, due to design, in a geometry, material composition, media, mass density, density of embedded elements and/or voids, and spatial arrangement of embedded elements and/or voids, of the target region along the at least one lateral direction; and
    wherein the at least one parameter characterizing the lateral structural feature comprises one or more parameters characterizing said geometry, material composition, media, mass density, density of embedded elements and/or voids, and/or spatial arrangement of embedded elements and/or voids.

5. The method of claim 1, wherein, in the analyzing of the plurality of measured signals, a pre-determined expected depth-dependence of the at least one parameter characterizing the lateral structural feature is taken into account.

6. The method of claim 1, wherein, in the analyzing of the plurality of measured signals, data fitting tools, optionally, derived using machine learning techniques and/or deep learning techniques, are used to obtain the depth-dependence of the at least one parameter.

7. The method of claim 1, wherein the analyzing of the plurality of measured signals comprises obtaining a time-dependence of a frequency, and/or a time-dependence of an amplitude, of Brillouin oscillations characterizing the scattered components of the probe pulse, and based thereon, obtaining the depth-dependence of the at least one parameter characterizing the lateral structural feature.

8. The method of claim 1, wherein the analyzing of the plurality of measured signals comprises removing a thermo-optic contribution to the plurality of measured signals.

9. The method of claim 1, wherein a frequency of the pump pulses and/or a frequency of the probe pulses are such as to maximize, or substantially maximize, an intensity of the scattered components of the probe pulses; and/or
    wherein the pump pulses and/or the probe pulses are polarized such as to maximize, or substantially maximize, intensities of the scattered components of the probe pulses.

10. The method of claim 1, wherein each of the pump pulses is configured to induce a mechanical strain in a lateral absorption layer(s) of the semiconductor device, and thereby produce the respective acoustic pulse, and wherein the absorption layer(s) is perpendicular to a longitudinal dimension of the target region, which parameterizes depth within the semiconductor device.

11. The method of claim 10, wherein the absorption layer(s) is silicon-based, wherein a duration of each of the pump pulses and probe pulses is shorter than about 10 psec, and wherein a width of the acoustic pulses is smaller than about 300 nm.

12. The method of claim 10, wherein the target region comprises the absorption layer(s).

13. The method of claim 10, wherein the absorption layer is positioned adjacently to a lateral external surface of the semiconductor device on which the pump pulses and/or the probe pulses are projected, such that each of the acoustic pulses propagates away from the lateral external surface of the semiconductor device; or
    wherein the absorption layer is positioned within the semiconductor device, such that each of the acoustic pulses propagates away from the absorption layer towards a lateral external surface, on which the pump pulses and/or the probe pulses are projected.

14. The method of claim 1, wherein the target region comprises a plurality of the lateral structural feature, the plurality of the lateral structural feature defining a composite lateral structural feature, wherein a wavelength of the pump pulse and a wavelength of the probe pulse are configured to allow simultaneously probing the composite lateral structural feature, and wherein, in the operation of analyzing the plurality of measured signals, the obtained depth-dependence of the at least one parameter characterizing the lateral structural feature is an average depth-dependence over the plurality of the composite lateral structural feature.

15. The method of claim 14, wherein the semiconductor device is a fin field-effect transistor (FinFET), wherein the target region comprises a plurality of fins, disposed in parallel to one another, such as to form the composite lateral structural feature, wherein the at least one parameter characterizing the lateral structural feature comprises a parameter corresponding to an average width of the fins, and, optionally, wherein the pump pulses and the probe pulses are linearly polarized in parallel, or substantially in parallel, to an elongate dimension of the fins.

16. The method of claim 14, wherein the semiconductor device is a vertical-NAND stack, wherein the target region comprises a plurality of holes projecting into the target region in parallel to a longitudinal dimension of the target region, which parameterizes depth within the vertical-NAND stack, wherein the holes are disposed such as to form the composite lateral structural feature, and wherein the at least one parameter characterizing the composite lateral structural feature comprises a parameter corresponding to an average diameter or average area of the holes.

17. The method of claim 16, wherein the probe pulse is linearly polarized along a lateral direction, which is parallel to a first direction, defined by rows of a two-dimensional rectangular array, or a second direction, defined by columns of the two-dimensional rectangular array, thereby increasing a measurement sensitivity along the second direction or the first direction, respectively.

18. The method of claim 1, wherein the probe pulse is characterized by a first probe wavelength and/or a first probe polarization, and/or wherein the pump pulse is characterized by a first pump wavelength and/or a first pump polarization;
    wherein the method further comprises, prior to the operation of analyzing the plurality of measured signals, repeating the operation of obtaining a plurality of measured signals, with respect to (i) a second probe pulse, characterized by a second probe wavelength and/or a second polarization, and/or (ii) a second pump pulse, characterized by a second pump wavelength and/or a second pump polarization, thereby obtaining a second plurality of measured signals; and
    wherein in the operation of analyzing the plurality of measured signals, the plurality of measured signals is analyzed together with at least the second plurality of measured signals.

19. A computerized system for depth-profiling of semiconductor devices, the system comprising an optical setup and a measurement data analysis module, wherein the optical setup is configured to obtain a plurality of measured signals from a target region of a semiconductor device by repeatedly:
    projecting an optical pump pulse on the semiconductor device, such as to produce an acoustic pulse, which propagates within the target region, wherein a wavelength of the pump pulse is at least two times greater than a lateral extent of a lateral structural feature of the semiconductor device in the target region along at least one lateral direction;
    projecting an optical probe pulse on the semiconductor device, such that the probe pulse undergoes Brillouin scattering off the acoustic pulse within the target region; and
    detecting a scattered component of the probe pulse, thereby obtaining a respective measured signal from the plurality of measured signals;
    wherein in each repetition the probe pulse is scattered off the acoustic pulse at a respective depth within the target region; and
    wherein the measurement data analysis module is configured to analyze the plurality of measured signals, or a plurality of signals derived therefrom, to obtain a depth-dependence of at least one parameter characterizing the lateral structural feature.

20. A non-transitory computer-readable storage medium storing instructions that cause a semiconductor device analysis system to:
    obtain a plurality of measured signals of a semiconductor device, which comprises a target region, comprising a lateral structural feature, by implementing a plurality of times sub-operations of:
        projecting an optical pump pulse on the semiconductor device, such as to produce an acoustic pulse, which propagates within the target region of the semiconductor device, wherein a wavelength of the pump pulse is at least two times greater than a lateral extent of the lateral structural feature along at least one lateral direction;
        projecting an optical probe pulse on the semiconductor device, such that the probe pulse undergoes Brillouin scattering off the acoustic pulse within the target region; and
        detecting a scattered component of the probe pulse to obtain a measured signal;
    wherein in each implementation the respective probe pulse is scattered off the acoustic pulse at a respective depth within the target region, such that the target region is probed at a plurality of depths; and
    analyze the plurality of measured signals to obtain a depth-dependence of at least one parameter characterizing the lateral structural feature.

* * * * *